US007911326B2

(12) United States Patent
Sutardja

(10) Patent No.: US 7,911,326 B2
(45) Date of Patent: Mar. 22, 2011

(54) TIME UPDATING AND LOAD MANAGEMENT SYSTEMS

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 1059 days.

(21) Appl. No.: 11/700,433

(22) Filed: Jan. 31, 2007

(65) Prior Publication Data

US 2008/0157938 A1 Jul. 3, 2008

Related U.S. Application Data

(60) Provisional application No. 60/883,255, filed on Jan. 3, 2007.

(51) Int. Cl.

| | |
|---|---|
| ***G08B 1/00*** | (2006.01) |
| ***G08C 19/04*** | (2006.01) |
| ***G08C 19/10*** | (2006.01) |
| ***G05B 11/01*** | (2006.01) |
| ***G05B 19/02*** | (2006.01) |
| ***G04C 11/02*** | (2006.01) |
| ***G04C 13/00*** | (2006.01) |
| ***G04C 13/08*** | (2006.01) |
| ***G04C 5/00*** | (2006.01) |
| ***F26B 3/00*** | (2006.01) |
| ***F26B 19/00*** | (2006.01) |

(52) U.S. Cl. ......... 340/310.11; 340/310.12; 340/310.13; 340/309.16; 340/870.11; 340/825.22; 368/52; 368/47; 368/59; 368/184; 34/494; 34/495; 34/554; 34/555

(58) Field of Classification Search ............. 340/310.11, 340/310.12, 310.13, 309.16, 870.11, 825.22, 340/710.06; 368/52, 47, 59, 1, 184, 304; 968/920; 34/494, 495, 554, 555
See application file for complete search history.

(56) References Cited

U.S. PATENT DOCUMENTS

| | | | | |
|---|---|---|---|---|
| 4,360,881 | A * | 11/1982 | Martinson | 700/298 |
| 6,734,784 | B1 * | 5/2004 | Lester | 340/310.12 |
| 6,868,621 | B1 * | 3/2005 | Grimm et al. | 34/92 |
| 2002/0011923 | A1 * | 1/2002 | Cunningham et al. | 340/310.01 |
| 2002/0135495 | A1 | 9/2002 | Lei et al. | |
| 2002/0140547 | A1 * | 10/2002 | Litwin et al. | 340/310.01 |
| 2003/0034443 | A1 * | 2/2003 | Kouznetsov et al. | 250/222.2 |

(Continued)

FOREIGN PATENT DOCUMENTS

WO WO2006/123940 11/2006

OTHER PUBLICATIONS

Notification of Transmittal of the International Search Report and the Written Opinion of the International Searching Authority, or the Declaration dated Sep. 22, 2008 in reference to PCT/US2007/026388.

(Continued)

*Primary Examiner* — Benjamin C Lee
*Assistant Examiner* — Andrew Bee

(57) ABSTRACT

A master generator that updates time data of remote devices comprises an acquisition module, a clock module, an encoding module, and a transmission module. The acquisition module acquires time data representing current time of day. The clock module receives and stores the time data from the acquisition module and periodically updates the time data. The encoding module encodes the time data from the clock module into time messages. The transmission module selectively superimposes the time messages onto a power signal.

53 Claims, 23 Drawing Sheets

U.S. PATENT DOCUMENTS

| | | | | |
|---|---|---|---|---|
| 2003/0085795 | A1 * | 5/2003 | An | 340/3.1 |
| 2005/0043907 | A1 * | 2/2005 | Eckel et al. | 702/62 |
| 2005/0110650 | A1 * | 5/2005 | Haines | 340/825.52 |
| 2008/0272934 | A1 * | 11/2008 | Wang et al. | 340/870.11 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

IEEE Std 802.11a-1999 (Supplement to IEEE Std 802.11-1999) [Adopted by ISO/IEC and redesignated as ISO/IEC 8802-11: 1999/ Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.11h—2003 (Amendment to IEEE Std 802.11, 1999 Edition (Reaff 2003)); as amended by IEEE Stds 802.11a-1999, 802.11b-1999, 802.11b-1999/Cor 1-2001, 802.11d-2001, and 802.11g-2003; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.

802.11n; IEEE P802.11-04/0889r6; Wireless LANs, TGn Sync Proposal Technical Specification; May 2005; 131 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 23 pages.

IEEE Std 802.3-2002 (Revision of IEEE Std 802.3, 2000 Edition) 802.3 IEEE Standard for Information Technology—Telecommunications and information exchange between systems—Local and metropolitan area networks—Specific requirements; Part 3: Carrier sense multiple access with collision detection (CSMA/CD) access method and physical layer specifications; IEEE Computer Society, Sponsored by the LAN/MAN Standards Committee; Mar. 8, 2002; 26 page intro and table of contents; Section One: pp. 1-551.

IEEE Std 802.3-2002 (Revision of IEEE Std 802.3, 2000 Edition) 802.3 IEEE Standard for Information Technology—Telecommunications and information exchange between systems—Local and metropolitan area networks—Specific requirements; Part 3: Carrier sense multiple access with collision detection (CSMA/CD) access method and physical layer specifications; IEEE Computer Society, Sponsored by the LAN/MAN Standards Committee; Mar. 8, 2002; Section Two: pp. 1-581.

IEEE Std 802.3-2002 (Revision of IEEE Std 802.3, 2000 Edition) 802.3 IEEE Standard for Information Technology—Telecommunications and information exchange between systems—Local and metropolitan area networks—Specific requirements; Part 3: Carrier sense multiple access with collision detection (CSMA/CD) access method and physical layer specifications; IEEE Computer Society, Sponsored by the LAN/MAN Standards Committee; Mar. 8, 2002; Section Three, pp. 1-379.

X10 Theory; Smart Home Systems; www.smarthomeusa.com/into/x10theory/x10theory/#theory; Oct. 30, 2006; 4 pages.

Walfish, Shabsi et al; "EE161: X10 Receiver Project"; Oct. 31, 2006; 30 pages.

Specification of the Bluetooth System—Specification vol. 0; Master Table of Contents & Compliance Requirements; Covered Core Package version: 2.0 +EDR; Current Master TOC issued: Nov. 4, 2004; Part A, pp. 1-74; vol. 1, pp. 1-92; vol. 2 & 3, pp. 1-814; vol. 4, pp. 1-250.

* cited by examiner

TIME UPDATING AND LOAD MANAGEMENT SYSTEMS

CROSS-REFERENCE TO RELATED APPLICATIONS

This application claims the benefit of U.S. Provisional Application No. 60/883,255, filed on Jan. 3, 2007. The disclosure of the above application is incorporated herein by reference.

FIELD

The present disclosure relates to remote control of appliances, and more specifically to remote control of appliances via electrical distribution lines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of a residential electrical distribution system is depicted. A house 100 includes an electrical panel 102, which communicates with a utility company 104. The electrical panel 102 distributes electric current from the utility company 104 to an electrical distribution line 106. The house 100 includes appliances such as a stove 110, a video cassette recorder (VCR) 112, a clock (such as a wall clock or alarm clock) 114, and a microwave 116, which consume power delivered by the electrical distribution line 106.

The stove 110, VCR 112, clock 114, and microwave 116 include display clocks 120, 122, 124, and 126, respectively, which graphically display the time of day. The display clocks 120, 122, 124, and 126 must each be programmed when the associated appliance is installed, when power is lost in the house 100, and when daylight saving time begins and ends.

SUMMARY

A master generator that updates time data of remote devices comprises an acquisition module, a clock module, an encoding module, and a transmission module. The acquisition module acquires time data representing current time of day. The clock module receives and stores the time data from the acquisition module and periodically updates the time data. The encoding module encodes the time data from the clock module into time messages. The transmission module selectively superimposes the time messages onto a power signal.

In other features, the master generator further comprises a backup power source that powers the clock module when power is interrupted to the master generator. The clock module stores and periodically updates date data. The encoding module encodes the date data into date messages. The transmission module superimposes the date messages onto the power signal. The acquisition module includes a radio frequency (RF) receiver. The acquisition module includes a network interface.

In further features, the network interface receives the time data from a network. An integrated circuit comprises the master generator; and a network interface that communicates with a network. The acquisition module includes a user interface that receives time data from a user. The acquisition module includes a power line carrier receiver. The master generator further comprises a load control module that generates load control commands based upon load control instructions. The acquisition module receives the load control instructions.

In still other features, the encoding module encodes the load control commands into the load control messages. The transmission module superimposes the load control messages onto the power signal. The load control module controls a plurality of devices that are in communication with the power signal and generates a single load control command for controlling the plurality of devices. The acquisition module includes a power line carrier receiver that receives the load control instructions from a utility company via the power signal.

In other features, the master generator further comprises a sensor input module that receives environment signals. The sensor input module receives signals from at least one of a temperature sensor, a light sensor, a water sensor, a barometer, a hygrometer, and an anemometer. A system comprises the master generator; and a device comprises a clock module that stores first time data representing time of day; a display module that visually displays the first time data; a receiving module that receives the time messages via the power signal; and an updating module that selectively replaces the first time data based on the time messages.

In further features, the device further comprises a device control module that generates a control signal based upon load control messages in the power signal; and at least one power-consuming component that reduce power consumption based upon the control signal. The device comprises at least one of a water heater, a light fixture, a clothes washer, a clothes dryer, a heating ventilation air conditioning system, and a computer. The power-consuming component selectively reduces light output based upon the control signal. The power-consuming component selectively assumes one of a standby state and a hibernation state based upon the control signal. The power-consuming component selectively decreases one of heat output, operating voltage, and operating current based upon the control signal.

A method for updating time data of remote devices comprises acquiring time data representing current time of day; receiving, storing, and periodically updating the time data; encoding the time data from the clock module into time messages; and selectively superimposing the time messages onto a power signal.

In other features, the method further comprises providing a backup power source that powers the clock module when power is interrupted. The method further comprises storing and periodically updating date data; encoding the date data into date messages; and selectively superimposing the date messages onto the power signal. The acquiring includes using a radio frequency (RF) receiver. The acquiring includes using a network interface. The network interface receives the time data from a network.

In further features, the method further comprises integrating a master generator and the network interface in an integrated circuit. The method further comprises receiving time data from a user via a user interface. The method further comprises receiving time data via a power line carrier receiver. The method further comprises generating load control commands based upon load control instructions; encoding the load control commands into the load control messages, and selectively superimposing the load control messages onto the power signal.

In still other features, the method further comprises generating a single load control command to control a plurality of devices. The method further comprises receiving the load control instructions from a utility company via the power signal. The method further comprises sensing environmental signals. The method further comprises providing at least one of a temperature sensor, a light sensor, a water sensor, a barometer, a hygrometer, and an anemometer. The method further comprises providing a device that stores first time data representing time of day; visually displays the first time data; receives the time messages via the power signal; and selectively replaces the first time data based on the time messages.

In other features, the method further comprises generating a control signal based upon load control messages in the power signal; and reducing power to at least one power-consuming component based upon the control signal. The method further comprises reducing light output based upon the control signal. The method further comprises assuming one of a standby state and a hibernation state based upon the control signal. The method further comprises decreasing at least one of heat output, operating voltage, and operating current based upon the control signal.

A master generator that updates time data of remote devices comprises acquisition means for acquiring time data representing current time of day; clock means for receiving and storing the time data from the acquisition means and for periodically updating the time data; encoding means for encoding the time data from the clock means into time messages; and transmission means for selectively superimposing the time messages onto a power signal.

In other features, the master generator further comprises backup power means for powering the clock means when power is interrupted to the master generator. The clock means stores and periodically updates date data. The encoding means encodes the date data into date messages. The transmission means superimposes the date messages onto the power signal. The acquisition means includes radio frequency (RF) receiving means for receiving. The acquisition means includes network interface means for providing a network interface.

In further features, the network interface means receives the time data from a network. An integrated circuit comprises the master generator; and network interface means for communicating with a network. The acquisition means includes user interface means for receiving time data from a user. The acquisition means includes a power line carrier receiver. The master generator further comprises load control means for generating load control commands based upon load control instructions. The acquisition means receives the load control instructions. The encoding means encodes the load control commands into the load control messages.

In still other features, the transmission means superimposes the load control messages onto the power signal. The load control means controls a plurality of devices that are in communication with the power signal and generates a single load control command for controlling the plurality of devices. The acquisition means includes power line carrier receiving means for receiving the load control instructions from a utility company via the power signal. The master generator further comprises sensing means for receiving environmental signals. The sensing means receives signals from at least one of a temperature sensor, a light sensor, a water sensor, a barometer, a hygrometer, and an anemometer.

In other features, a system comprises the master generator; and a device comprises clock means for storing first time data representing time of day; display means for visually displaying the first time data; receiving means for receiving the time messages via the power signal; and updating means for selectively replacing the first time data based on the time messages. The device further comprises device control means for generating a control signal based upon load control messages in the power signal; and at least one power-consuming means for consuming power and for reducing power consumption based upon the control signal.

In further features, the device comprises at least one of a water heater, a light fixture, a clothes washer, a clothes dryer, a heating ventilation air conditioning system, and a computer. The power-consuming means reduces light output based upon the control signal. The power-consuming means assumes one of a standby state and a hibernation state based upon the control signal. The power-consuming means decreases one of heat output, operating voltage, and operating current based upon the control signal.

A device comprises a display module that visually displays first time data representing time of day; a clock module that stores and updates the first time data; a receiving module that receives a power signal including a power line carrier signal and that recovers second time data from the power line carrier signal; and a control module that updates the first time data of the clock module based on the second time data.

In other features, the clock module stores first date data. The receiving module recovers second date data from the power line carrier signal and the control module updates the first date data based on the second date data. The receiving module includes a filter that filters the power signal. The receiving module includes a crossing detector that generates crossing signals when a voltage of the power signal crosses a reference voltage. The receiving module recovers the second time data using the crossing signals.

In further features, the device further comprises a power-consuming component that selectively reduces power consumption of the device based upon a control signal. The power line carrier includes load control commands. The control module selectively generates the control signal based upon the load control commands. The device is selected from a group consisting of a water heater, a light fixture, a clothes washer, a clothes dryer, a heating ventilation air conditioning system, and a computer.

In still other features, the power-consuming component selectively reduces light output based upon the control signal. The power-consuming component selectively assumes one of a standby state and a hibernation state based upon the control signal. The power-consuming component selectively decreases heat output of the device based upon the control signal. The power-consuming component selectively decreases cooling output of the device based upon the control signal. The power-consuming component selectively suspends operation of the device based upon the control signal.

In other features, the power-consuming component suspends operation of the device for a period of time specified by the control signal. The power-consuming component selectively reduces one of operating voltage and operating current of the device based upon the control signal. The device is selected from a group consisting of a stove, a video-cassette recorder, a wall clock, an alarm clock, and a microwave.

A method comprises storing and updating first time data representing time of day; visually displaying the first time data; receiving a power signal including a power line carrier signal at a device; recovering second time data from the power line carrier signal; and updating the first time data based on the second time data.

In other features, the method further comprises storing and updating first date data; recovering second date data from the power line carrier signal; and updating the first date data based on the second date data. The method further comprises filtering the power signal. The method further comprises generating crossing signals when a voltage of the power signal crosses a reference voltage. The method further comprises recovering the second time data using the crossing signals. The method further comprises selectively reducing power consumption of the device based upon a control signal.

In further features, the power line carrier includes load control commands; and selectively generating the control signal based upon the load control commands. The method further comprises selecting the device from a group consisting of a water heater, a light fixture, a clothes washer, a clothes dryer, a heating ventilation air conditioning system, and a computer. The power-consuming component selectively reduces light output based upon the control signal. The power-consuming component selectively assumes one of a standby state and a hibernation state based upon the control signal. The power-consuming component selectively decreases heat output of the device based upon the control signal.

In still other features, the power-consuming component selectively decreases cooling output of the device based upon the control signal. The power-consuming component selectively suspends operation of the device based upon the control signal. The power-consuming component suspends operation of the device for a period of time specified by the control signal. The power-consuming component selectively reduces one of operating voltage and operating current of the device based upon the control signal. The method further comprises selecting the device from a group consisting of a stove, a video-cassette recorder, a wall clock, an alarm clock, and a microwave.

A device comprises display means for visually displaying first time data representing time of day; clock means for storing and updating the first time data; receiving means for receiving a power signal including a power line carrier signal and for recovering second time data from the power line carrier signal; and control means for updating the first time data of the clock means based on the second time data.

In other features, the clock means stores first date data. The receiving means recovers second date data from the power line carrier signal. The control means updates the first date data based on the second date data. The receiving means includes filter means for filtering the power signal. The receiving means includes crossing detector means for generating crossing signals when a voltage of the power signal crosses a reference voltage. The receiving means recovers the second time data using the crossing signals. The device further comprises power-consuming means for consuming power and for selectively reducing power consumption based upon a control signal.

In further features, the power line carrier includes load control commands. The control means selectively generates the control signal based upon the load control commands. The device is selected from a group consisting of a water heater, a light fixture, a clothes washer, a clothes dryer, a heating ventilation air conditioning system, and a computer. The power-consuming means selectively reduces light output based upon the control signal. The power-consuming means selectively assumes one of a standby state and a hibernation state based upon the control signal. The power-consuming means selectively decreases heat output of the device based upon the control signal.

In still other features, the power-consuming means selectively decreases cooling output of the device based upon the control signal. The power-consuming means selectively suspends operation of the device based upon the control signal. The power-consuming means suspends operation of the device for a period of time specified by the control signal. The power-consuming means selectively reduces one of operating voltage and operating current of the device based upon the control signal. The device is selected from a group consisting of a stove, a video-cassette recorder, a wall clock, an alarm clock, and a microwave.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
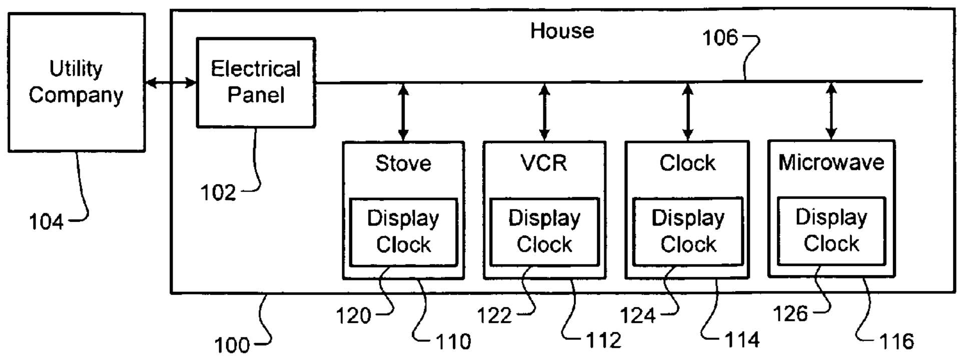
FIG. 1 Prior Art
FIG. 1 is a functional block diagram of a residential electrical distribution system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure discloses a system for automatically updating time on appliances or other electronic devices that communicate with the electrical distribution system of a home or other location. In addition, the present disclosure described load management of the appliances or other devices to reduce power consumption of these devices. The following discussion will initially relate to time updating systems followed by discussion of load management systems.

Figure 2:
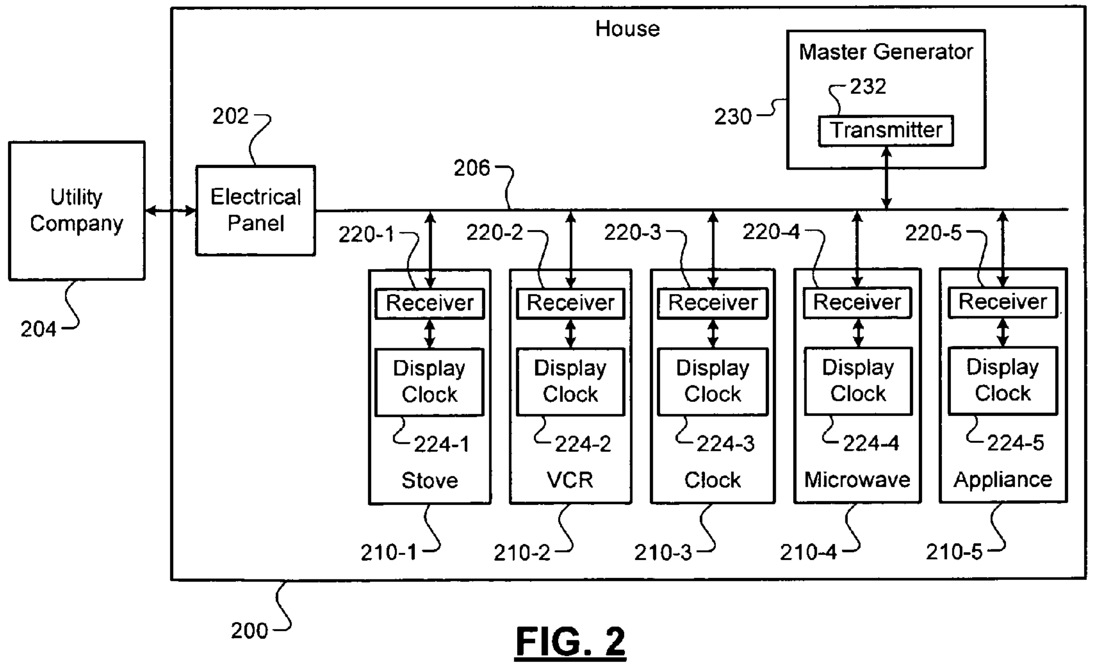
FIGS. 2-6 are functional block diagrams of exemplary electrical distribution systems according to the principles of the present disclosure.

Referring now to FIG. 2, a functional block diagram of an electrical distribution system according to the principles of the present disclosure is presented. A house 200 includes an electrical panel 202, which communicates with a utility company 204. The electrical panel 202 outputs one or more phases of electrical current onto one or more electrical distribution lines 206.

The house 200 includes appliances such as a stove 210-1, a videocassette recorder (VCR) 210-2, a clock (such as an alarm clock or wall clock) 210-3, a microwave 210-4, and/or other appliances 210-5. Other appliances 210-5 may include such appliances as a clothes washer, a clothes dryer, a hot water heater, a furnace, and a sprinkler system.

The stove 210-1, VCR 210-2, clock 210-3, microwave 210-4, and other appliances 210-5 include receivers 220-1, 220-2, 220-3, 220-4, and 220-5, respectively, which communicate with display clocks 224-1, 224-2, 224-3, 224-4, and 224-5, respectively. The appliances 210 receive electrical power from the electrical distribution line 206. The receivers 220 receive control signals transmitted over the electrical distribution line 206.

The house 200 includes a master generator 230, which includes a transmitter 232. The transmitter 232 transmits control and/or data signals onto the electrical distribution line 206. These control and/or data signals may include the current time of day, the date, and/or other control and/or data signals. The receivers 220 receive these control and/or data signals and update the associated display clocks 224. The master generator 230 may be programmed by a user with time data.

As used throughout the disclosure, time data may also be accompanied by, or be inclusive of, date data, unless specifically stated otherwise. Even if the master generator 230 does not communicate date data to the appliances 210, the master generator 230 may still store date data for other purposes, such as for updating time data based upon daylight savings time. The master generator 230 can then communicate time data to the appliances 210, which are in communication with the electrical panel 202. In this way, the user only has to set date and/or time in one location. The master generator 230 may include a backup battery, so that when power is lost, time data is preserved.

Figure 3:
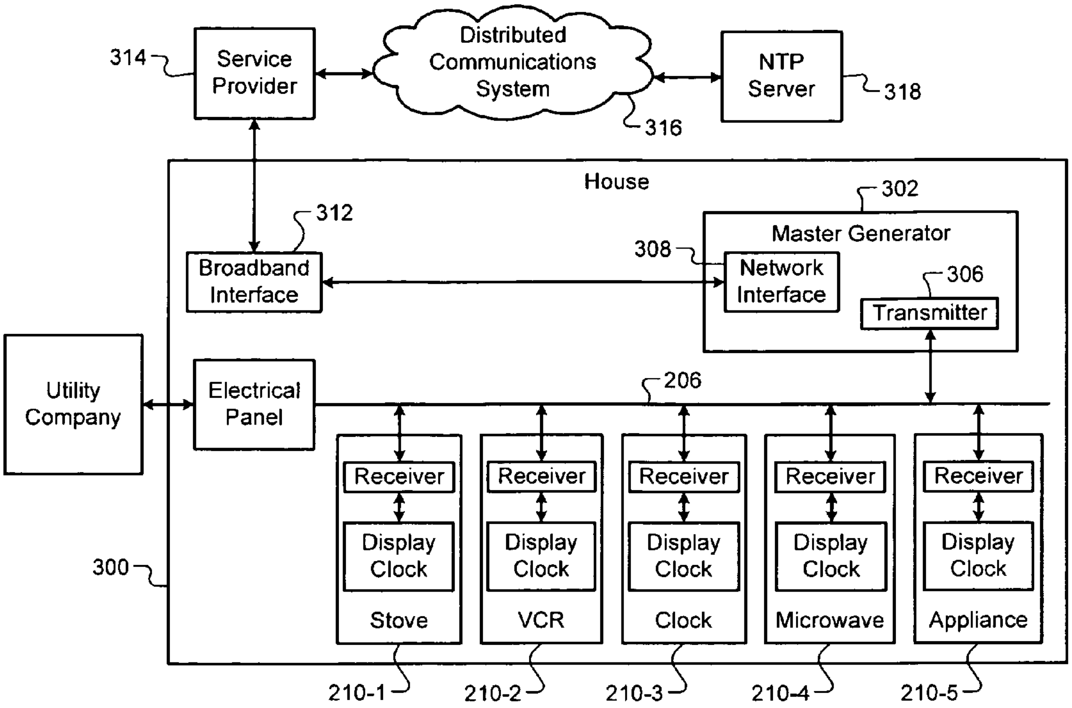

Referring now to FIG. 3, a functional block diagram of an electrical distribution system where time data is received via a network is presented. For purposes of clarity, reference numerals from FIG. 2 are used to identify similar components. A house 300 includes a master generator 302, which includes a transmitter 306 and a network interface 308. The network interface 308 communicates with a broadband interface 312.

The network interface 308 may be wireline and/or wireless, such as IEEE 802.3 and/or IEEE 802.11, 802.11a, 802.11b, 802.11g, 802.11h, 802.11n, 802.16, 802.20, and Bluetooth. The network interface 308 may also include a universal serial bus (USB) controller. The broadband interface 312 may include, for example, a cable modem, a digital subscriber line (DSL) modem, a satellite receiver, and/or a router. The broadband interface 312 communicates with a service provider 314.

The service provider 314 communicates through a distributed communications system 316, such as the Internet, with a network time protocol (NTP) server 318. In various implementations, the service provider 314 provides wireless access and the network interface 308 communicates directly with the service provider 314. In various implementations, the master generator 302 and the broadband interface 312 are co-located in a single device 320, and may be implemented as an integrated circuit or semiconductor device.

The master generator 302 can then contact the NTP server 318 or any other host on the distributed communication system 316 to obtain time data. The master generator 302 may also communicate with a local computer (now shown) via the network interface 308 to obtain time data from the local computer. The local computer may then query an NTP server, such as the NTP server 318, or obtain time data from a user. The transmitter 306 communicates time data to the appliances 210 over the electrical distribution line 206, as described in more detail below.

Figure 4:
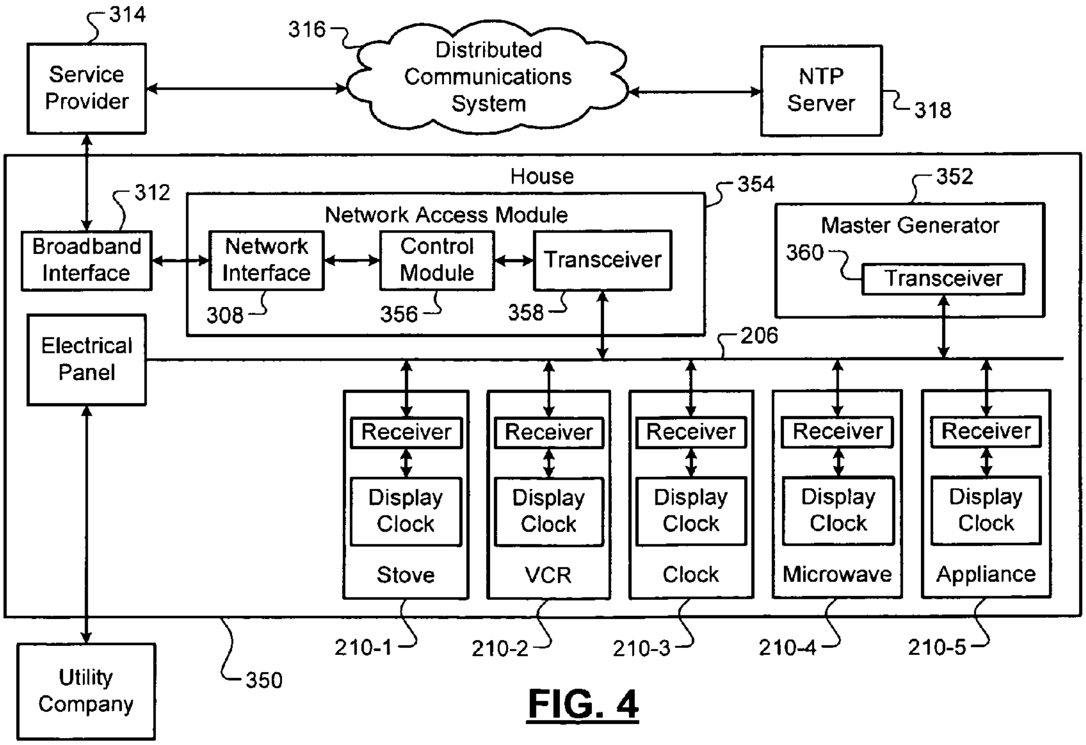

Referring now to FIG. 4, a functional block diagram of another exemplary electrical distribution system where time data is received via a network is presented. For purposes of clarity, reference numerals from FIG. 2 are used to identify similar components. A house 350 includes a master generator 352 and a network access module 354. The network access module 354 includes the network interface 308, which communicates with a host, such as the NTP server 318, on the distributed communications system 316 via the broadband interface 312.

The network interface 308 receives time data from the host. A control module 356 directs a transceiver 358 to transmit the time data over the electrical distribution line 206. The master generator 352 includes a transceiver 360 that receives time data from the network access module 354 via the electrical distribution line 206. The master generator 352 communicates time data for the appliances 210 onto the electrical distribution line 206 via the transceiver 360.

Figure 5:
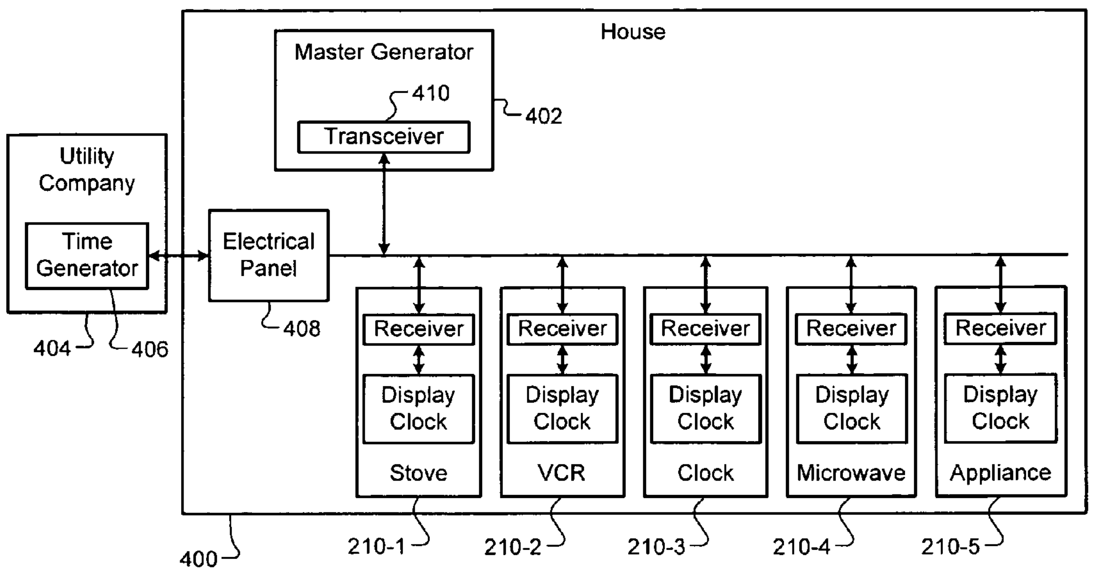

Referring now to FIG. 5, a functional block diagram of an exemplary electrical distribution system where time data is provided by a utility is presented. For purposes of clarity, reference numerals from FIG. 2 are used to identify similar components. A house 400 includes a master generator 402. A utility company 404 includes a time generator module 406. The house 400 includes an electrical panel 408, which communicates with the time generator module 406 of the utility company 404.

The time generator module 406 maintains time data and periodically transmits the time data to connected systems, such as the electrical panel 408. The master generator 402 includes a transceiver 410, which receives time data broadcast to the electrical panel 408. The master generator 402 then uses the transceiver 410 to transmit time data to the appliances 210. By re-broadcasting time data, the master generator 402 can amplify signal levels and translate between the data format used by the utility company 404 and that expected by the appliances 210.

Figure 6:
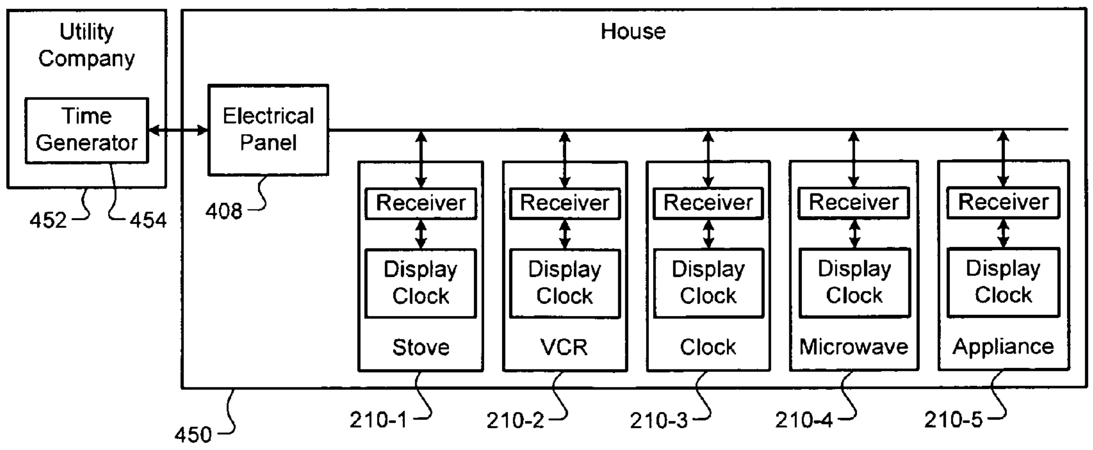

Referring now to FIG. 6, a functional block diagram of another exemplary electrical distribution system where time data is provided by a utility is presented. For purposes of clarity, reference numerals from FIG. 5 are used to identify similar components. A house 450 includes the appliances 210. A utility company 452 includes a time generator 454, which periodically broadcasts time data. This time data passes through the electrical panel 408 to the appliances 210. Each of the appliances 210 receives the time data and updates the associated display clock.

Figure 7:
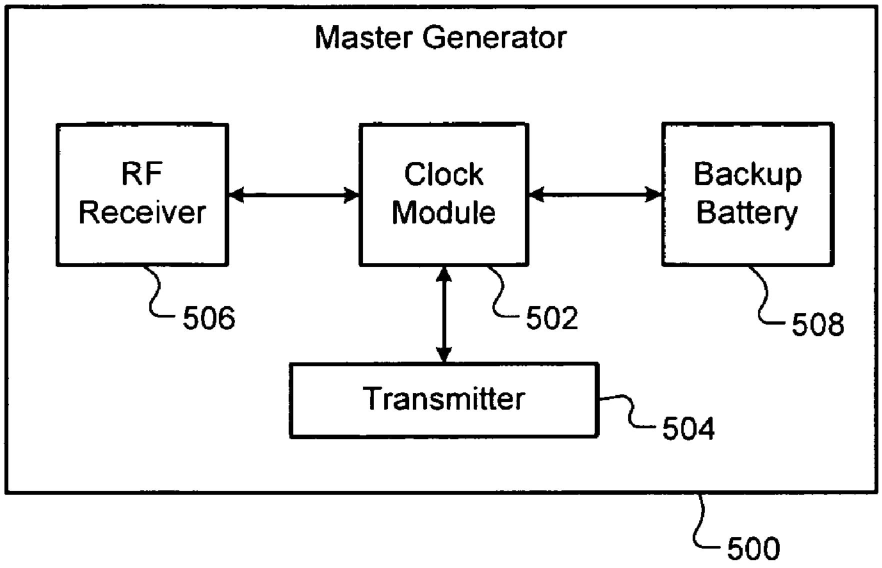
FIGS. 7-12 are functional block diagrams of exemplary master generators according to the principles of the present disclosure.

FIGS. 7-12 depict exemplary master generators, such as those employed in FIGS. 2-6. Referring now to FIG. 7, a functional block diagram of an exemplary master generator 500, such as the master generator 230 of FIG. 2, is presented. The master generator 500 includes a clock module 502, a transmitter 504, and a radio frequency (RF) receiver 506. The master generator 500 may also include a backup battery 508.

The clock module 502 receives time data from the RF receiver 506, which receives time data from a broadcaster such as the National Institute of Standards and Technology. The clock module 502 may be powered by the backup battery 508 when power is lost. The clock module 502 directs the transmitter 504 to communicate time data onto an attached electrical distribution line.

Figure 8:
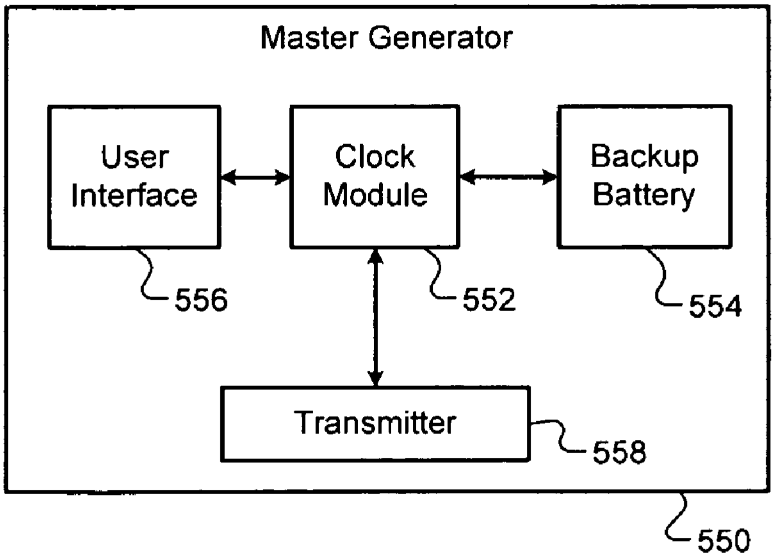

Referring now to FIG. 8, a functional block diagram of an exemplary master generator 550, such as the master generator 230 of FIG. 2, is presented. The master generator 550 includes a clock module 552, a backup battery 554, a user interface 556, and a transmitter 558. The clock module 552 obtains time data from a user via the user interface 556.

The backup battery 554 allows the clock module 552 to retain time data when power is lost. The clock module 552 transmits time data onto an electrical distribution line via the transmitter 558. This transmission may happen periodically. A rate at which the transmission occurs may be set by the user using the user interface 556. Transmission may be manually actuated through the user interface 556, such as by pressing a button.

Figure 9:
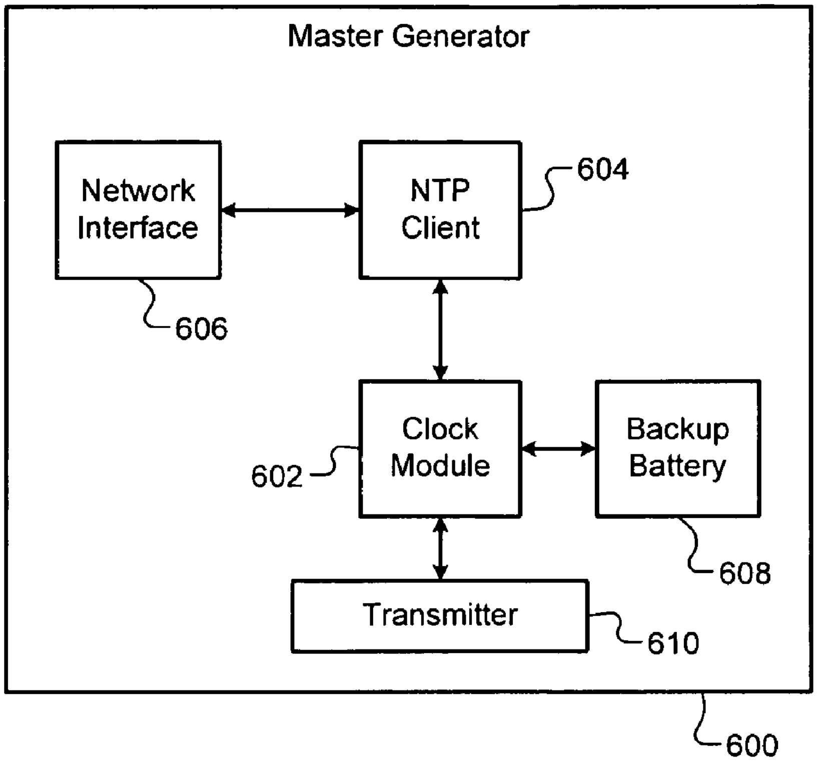

Referring now to FIG. 9, a functional block diagram of an exemplary master generator 600, such as the master generator 302 of FIG. 3, is presented. The master generator 600 includes a clock module 602, a network time protocol (NTP) client 604, a network interface 606, a backup battery 608, and a transmitter 610. The NTP client 604 communicates with an NTP server (not shown), whether on a distributed communications system, such as the Internet, or on a local computer network, via the network interface 606. The network interface 606 may be wireline or wireless.

The NTP client 604 communicates time data received from the NTP server to the clock module 602. The clock module 602 may be powered during power outages by the backup battery 608. The clock module 602 communicates time data onto electrical distribution lines via the transmitter 610. The clock module 602 may begin this transmission periodically.

Alternately, transmission may occur when the time data received from the NTP client 604 differs by more than a threshold from that previously stored in the clock module 602. In various embodiments, a second threshold may be defined. If received time data differ by more than the second threshold, data corruption may have occurred, and the clock module 602 can delay transmission until confirming time data is received.

Figure 10:
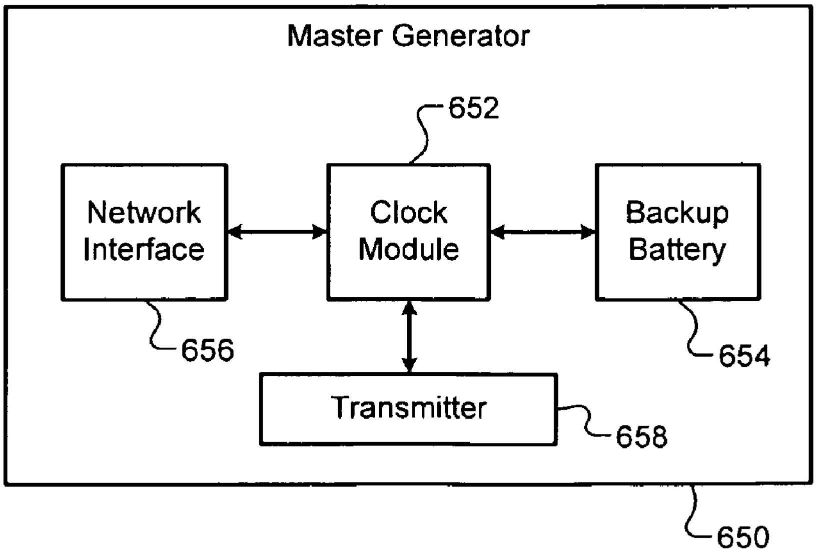

Referring now to FIG. 10, a functional block diagram of another exemplary master generator 650, such as the master generator 302 of FIG. 3, is presented. The master generator 650 includes a clock module 652, a backup battery 654, a network interface 656, and a transmitter 658. The clock module 652 receives time data via the network interface 656. The network interface 656 may be wireline or wireless.

The network interface 656 may communicate with a local computer (not shown) that accesses time data via network time protocol (NTP), with a network access module (not shown), etc. The clock module 652 may be powered during power outages by the backup battery 654. The clock module 652 may periodically transmit time data using the transmitter 658.

Figure 11:
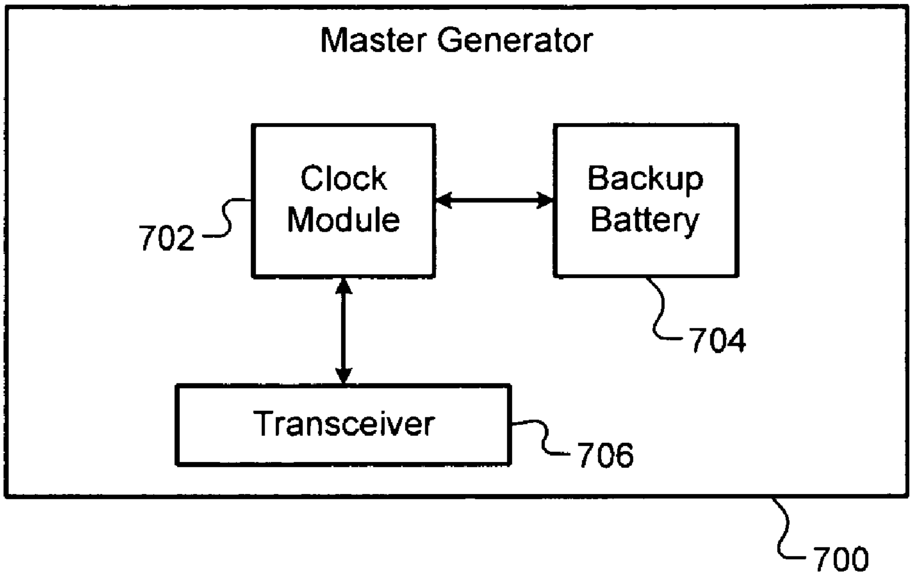

Referring now to FIG. 11, a functional block diagram of an exemplary master generator 700, such as the master generator 352 of FIG. 4, is presented. The master generator 700 includes a clock module 702, a backup battery 704, and a transceiver 706. The clock module 702 receives time data over an electrical distribution line via the transceiver 706. The time data may have been placed onto the electrical distribution line by a network access module or by a local computer.

The time data may also have been placed onto the electrical distribution line by a utility company, as shown in FIG. 5. When time data is already on the electrical distribution line, the appliances may be able to receive the data directly. The master generator 700, however, can be located within a building to receive the strongest possible signal. For example, when attempting to receive time data from the utility, the master generator 700 can be placed close to the electrical panel.

The transceiver 706 can then provide a signal adequate to reach all the appliances in the house. The clock module 702 may also format the time data specifically for the house. For instance, the time may be changed between 12-hour and 24-hour, and the month and day of the date may be swapped to appear in the European order of day/month/year. The backup battery 704 maintains the time data in the clock module 702 during power outages. The clock module 702 periodically may transmit time data onto the electrical distribution line using the transceiver 706.

Figure 12:
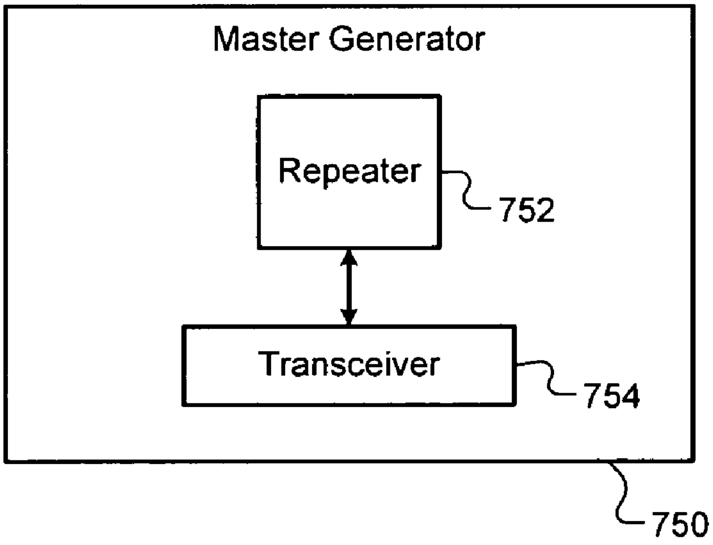

Referring now to FIG. 12, a functional block diagram of an exemplary master generator 750, such as the master generator 402 of FIG. 5, is presented. The master generator 750 includes a repeater module 752 and a transceiver 754. The transceiver 754 receives time data, which may have been transmitted by the utility company, from an electrical distribution line. The repeater module 752 receives time data from the transceiver 754.

The repeater module 752 then transmits the time data to local appliances, such as the appliances 210 of FIG. 5, via the transceiver 754. The repeater module 752 performs functions similar to that of the clock module 702 of FIG. 11. The repeater module 754 does not, however, store time data or periodically update the time data. The repeater module 752 can therefore only accurately broadcast time data at the moment it is received at the transceiver 754.

Figure 13:
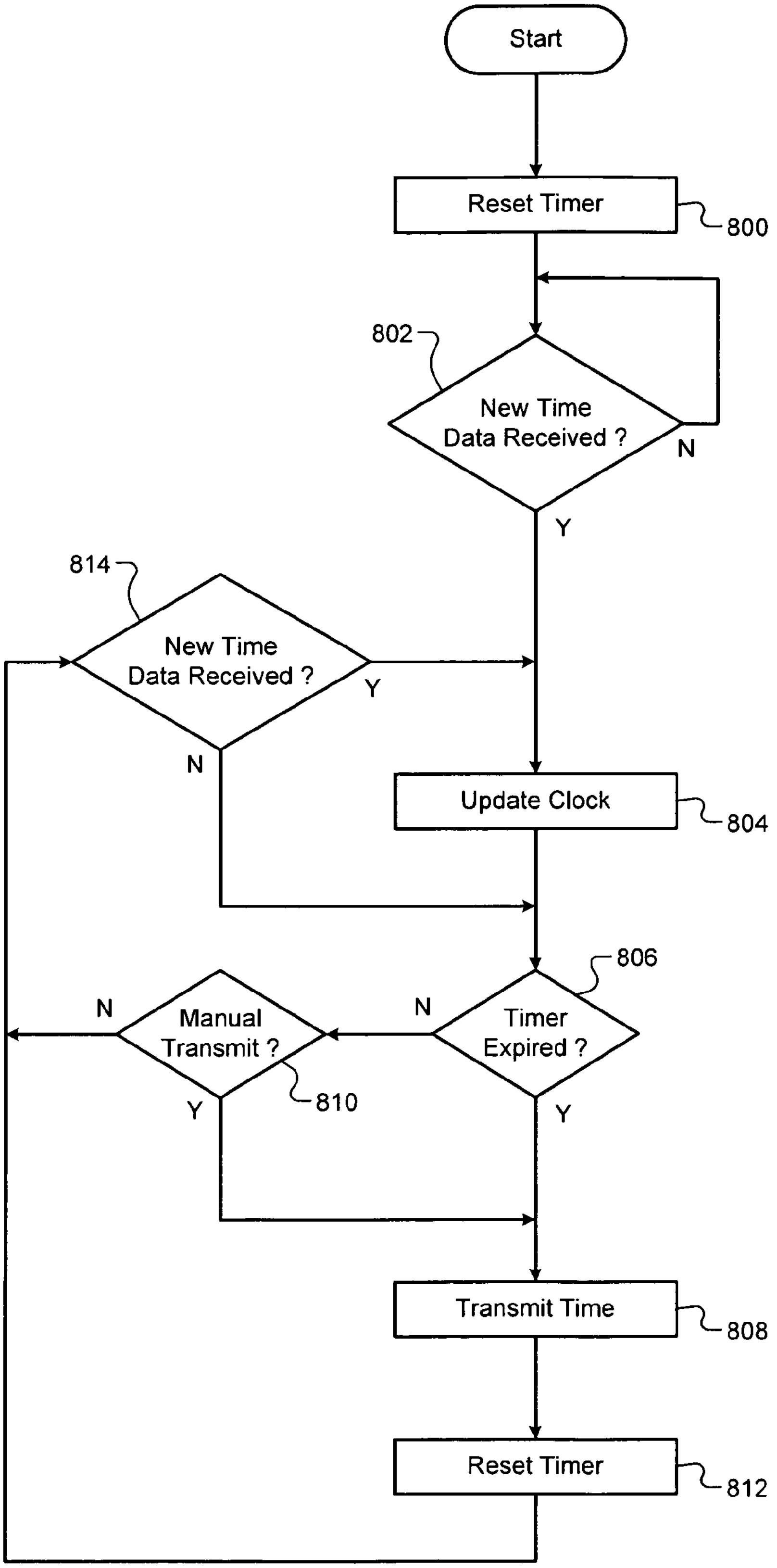
FIGS. 13-14 are flow charts depicting exemplary operation of master generators according to the principles of the present disclosure.

Referring now to FIG. 13, a flow chart depicts exemplary operation of a master generator according to the principles of the present disclosure. Control begins in step 800, where a timer is reset to a predetermined value. Control continues in step 802, where control determines whether new time data has been received. The steps of FIG. 13 therefore apply to a master generator that passively receives time data.

If new time data has been received, control transfers to step 804; otherwise, control remains in step 802. In step 804, new time data has been received, and the clock of the master generator is updated. Control then continues in step 806, where control determines whether the timer has expired. If true, control transfers to step 808; otherwise, control transfers to step 810. In step 808, time data is transmitted onto an electrical distribution line for receipt by appliances.

Control continues in step 812, where the timer is reset. The value to which the timer is reset determines how often time data is transmitted to the appliances. Control then continues with step 814. In step 814, control determines whether new time data has been received. If true, control transfers to step 804; otherwise, control transfers to step 806. In step 810, if a user has manually requested transmission of time data, control transfers to step 808; otherwise, control transfers to step 814.

Figure 14:
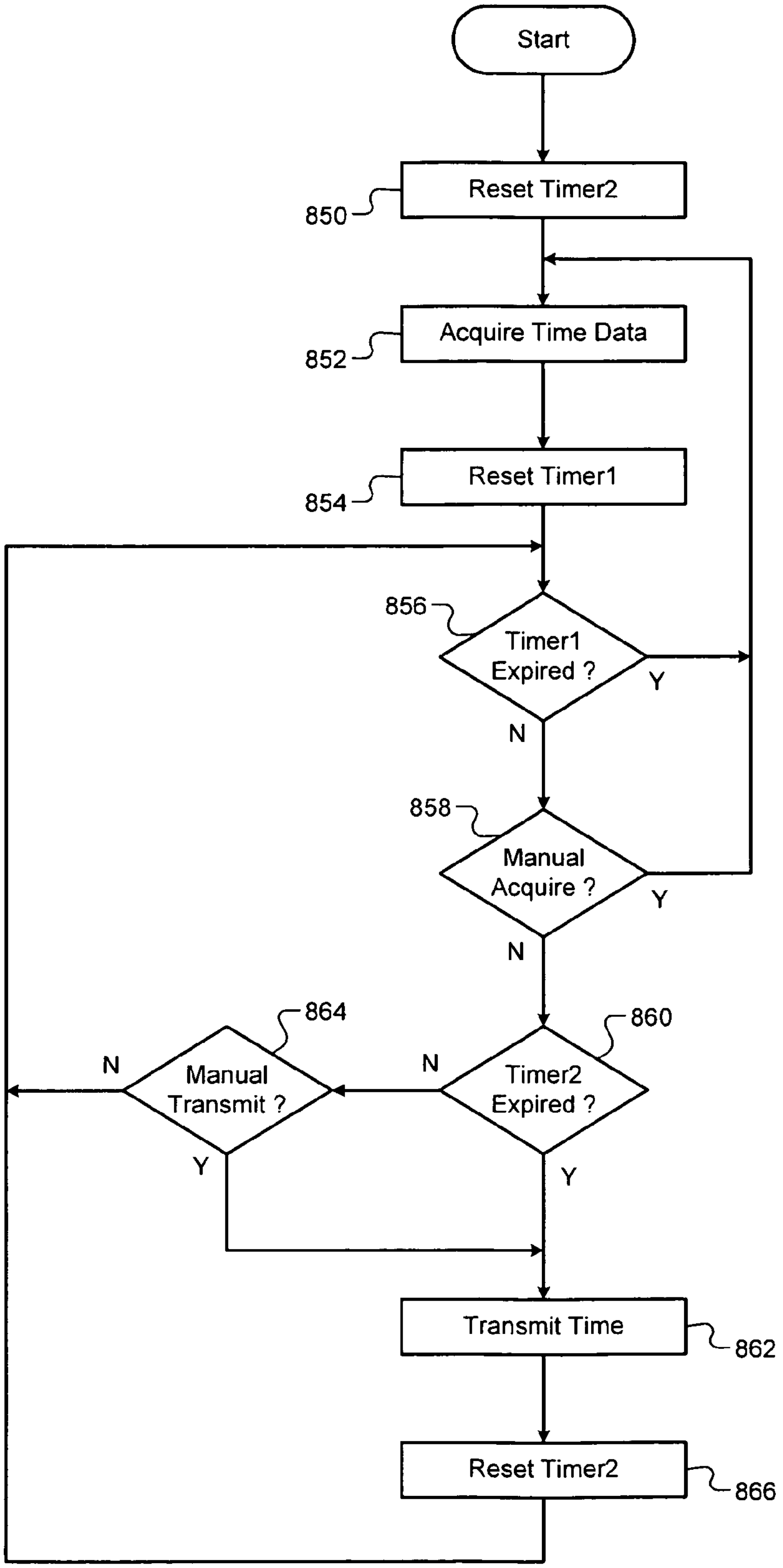

Referring now to FIG. 14, a flow chart depicts exemplary operation of an alternative master generator according to the principles of the present disclosure. Control begins in step 850, where a timer, timer2, is reset. Control continues in step 852, where time data is acquired. Time data may be acquired by sending a network time protocol (NTP) request or by receiving radio frequency (RF) signals.

Control continues in step 854, where a timer, timer1, is reset. The value of timer1 determines how often time data is acquired. Control continues in step 856. In step 856, if timer1 has expired, control returns to step 852; otherwise, control transfers to step 858. In step 858, if a user has manually requested that new time data be acquired, control returns to step 852; otherwise, control transfers to 860. In step 860, if timer2 has expired, control transfers to step 862; otherwise, control transfers to step 864.

In step 864, if a user has manually requested that time data be transmitted, control transfers to step 862; otherwise, control returns to step 856. In step 862, time data is transmitted to appliances via an electrical distribution line, and control continues in step 866. In step 866, timer2 is reset to a predetermined value, which determines how often the data will be transmitted to appliances.

Figure 15A:
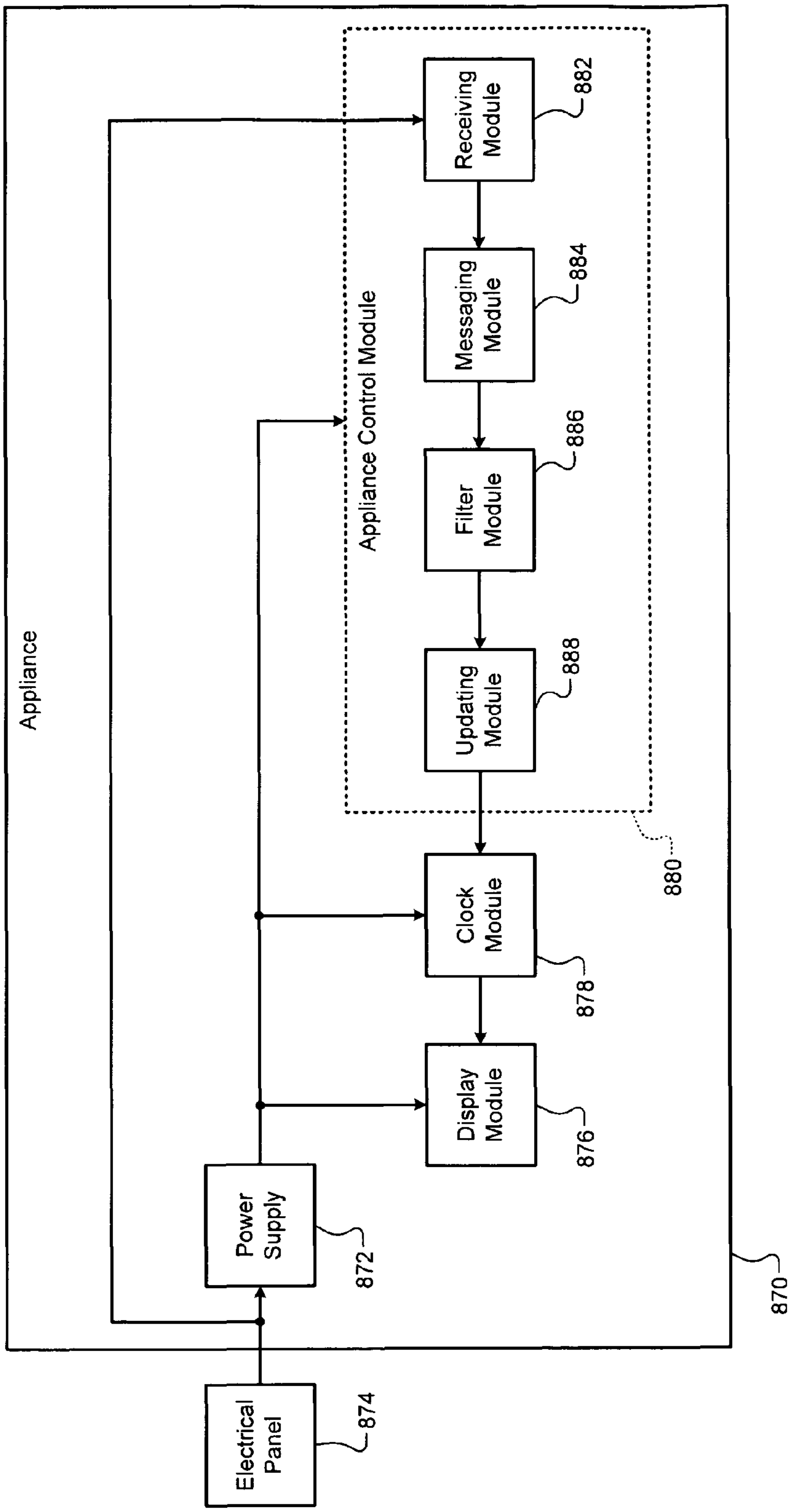
FIGS. 15A-15B are functional block diagrams of exemplary appliances according to the principles of the present disclosure.

Referring now to FIG. 15A, a functional block diagram of an exemplary appliance 870 according to the principles of the present disclosure is presented. The appliance 870 includes a power supply 872, which receives a power signal over an electrical distribution line from an electrical panel 874. The power supply 872 provides power to a display module 876, a clock module 878, and an appliance control module 880.

The appliance control module 880 includes a receiving module 882, a messaging module 884, a filter module 886, and an updating module 888. The receiving module 882 communicates with the electrical distribution line originating at the electrical panel 874. The receiving module 882 may include a coupling module that transforms the voltage form the electrical panel 874 to a lower voltage.

The receiving module 882 may analyze voltage on the electrical distribution line, such as at zero crossings of a power signal. Zero crossings occur when the voltage of the power signal crosses a reference potential such as zero volts in one or both of the positive or negative directions. The receiving module 882 may apply a frequency filter to only look at signals of interest and not at the power signal. The frequency filter may include a band-pass filter, a notch (band-stop) filter, a high-pass filter, etc. that rejects the frequency spectrum of the power signal. In various implementations, the frequency of the power signal may be 50 Hz or 60 Hz.

The receiving module 882 converts signals of interest into binary data. For instance, presence of a high frequency signal contemporaneous with a zero crossing may be represented as a binary 1, while absence of the high frequency signal at the zero crossing may be represented with binary 0. This binary data is communicated to the messaging module 884. The messaging module 884 analyzes the incoming binary data to determine the beginning and ending of messages.

The beginning of a message may be signified by a specific pattern of binary data, such as six sets of alternating zeros and ones. The messaging module 884 may also analyze messages for error correction data. For instance, a cyclic redundancy check (CRC) value may be included in the message. The messaging module 884 then determines whether the stored CRC value matches a value computed from the message, and optionally discards messages that fail this test.

The messaging module 884 may also analyze other indicators of reliable transmission. For instance, if every message is communicated on the electrical distribution line twice, the messaging module 884 may wait to determine that the second message matches the first, and then communicate only one of those messages to the filter module 886.

The messaging module 884 may determine the end of a message based upon a fixed message length in bits, or based on control data within the current or previous messages that indicates message length. The filter module 886 analyzes messages from the messaging module 884. The filter module 886 may discard messages not addressed to the appliance 870.

In various implementations, time data is communicated on the electrical distribution line and is addressed to all appliances. However, the time data may be marked with a house code, so that the filter module 886 can remove messages for other buildings. The filter module 886 also analyzes whether the incoming message is a message containing time data. Other messages, such as home automation messages, including light and fan control messages, may also be received.

The filter module 886 can determine the content of a message based upon control data within the message itself, such as header information. Alternatively, a message may be received indicating that one or more subsequent messages will contain time data. The filter module 886 extracts time data from the appropriate messages, and forwards the time data to the updating module 888.

The updating module 888 interprets the time data. The time data may be stored as an integer representing the number of seconds since midnight. Likewise, the date data may be stored as an integer representing the number of days since a specified date, such as 2000. Alternatively, time data could be stored as an integer representing the hour, an integer representing the minute, and in some implementations, an integer representing the second.

The updating module 888 may convert 24 hour time to 12 hour time, or vice versa. The updating module 888 may also transpose day and month in the date data, placing the date data in a day/month/year format common to Europe. The time data is communicated to the clock module 878. The clock module 878 maintains the time data and periodically updates it.

The display module 876 receives the time data from the clock module 878 and graphically displays the time data on an external face of the appliance 870. If the display module 876 displays hours, minutes, and seconds, the clock module 878 should update the time data at least once per second. If the display module 876 only displays hours and minutes, the clock module 878 can update time data once per minute.

Figure 15B:
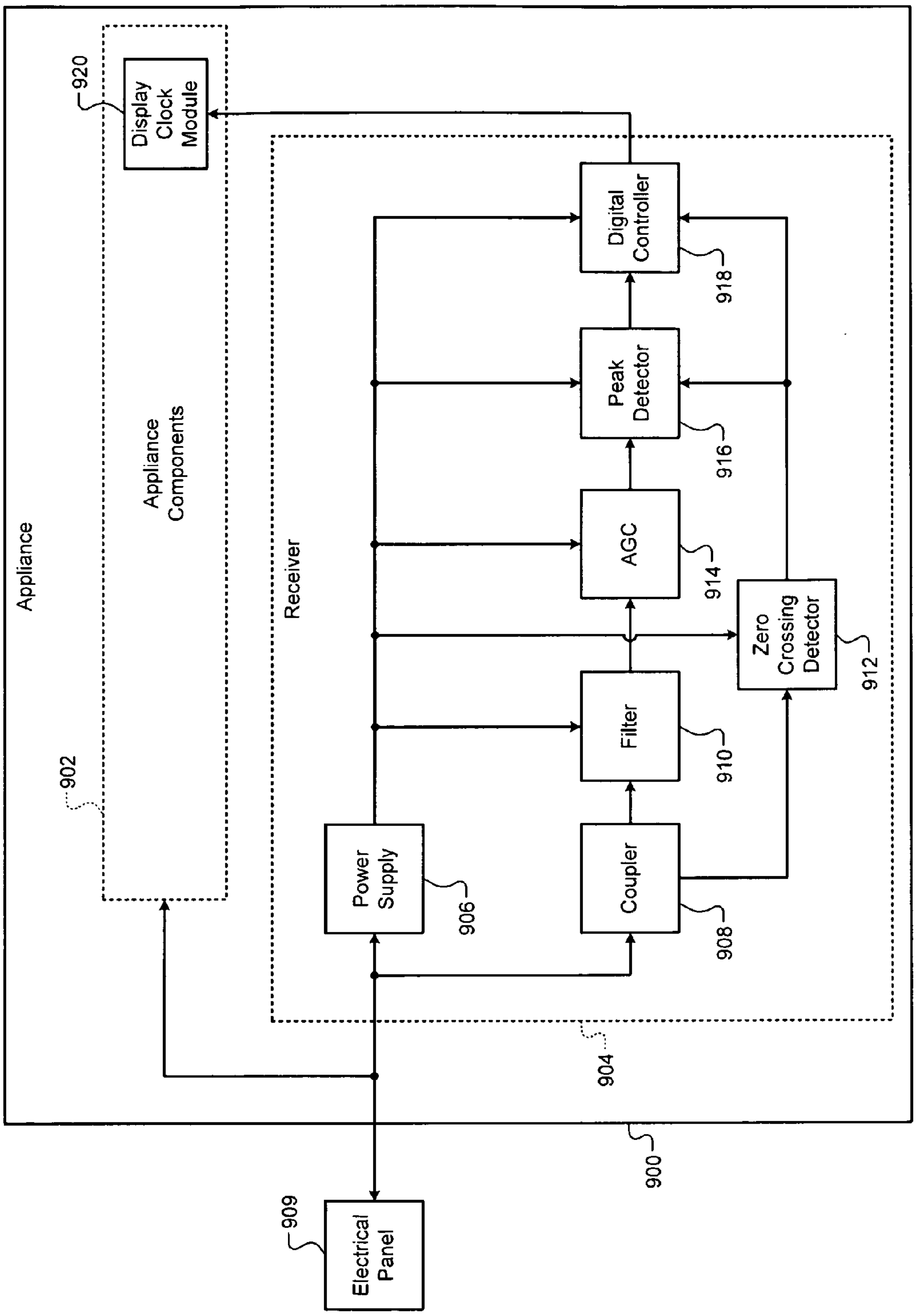

Referring now to FIG. 15B, a functional block diagram of an exemplary appliance 900 according to the principles of the present disclosure is presented. The appliance 900 includes appliance components 902 and a receiver 904. The receiver 904 includes a power supply 906 and a coupler 908. The power supply 906, coupler 908, and the appliance components 902 receive electrical power from an electrical panel 909.

Other devices (not shown) also communicate with the electrical panel 909. The power supply 906 provides power to components of the receiver 904. The receiver 904 may include a filter 910, a zero crossing detector 912, an automatic gain control (AGC) module 914, a peak detector 916, and a digital controller 918. The coupler 908 may step down the voltage received from the electrical panel 202 and/or electrically isolate the filter 910.

The filter 910 may include a filter such as a notch or band-pass filter to pass frequencies of interest riding on the power signal, such as 120 kHz, and reject the power signal. The filter 910 may include multiple stages to achieve adequate filtration of the power signal. The AGC module 914 receives the output of the filter, and amplifies the output to a predetermined level. The zero crossing detector 912 communicates with the coupler 908, and determines when the incoming power signal crosses zero volts in either of the positive or negative directions.

For most power systems in the United States, the power signal is a 60 Hz sign wave, and therefore zero crossings occur 120 times per second. The zero crossing detector 912 signals zero crossing events to the peak detector 916 and the digital controller 918. The peak detector 916 determines whether the output of the AGC includes a signal of interest contemporaneous with a zero crossing.

Presence or absence of a signal at each zero crossing is communicated to the digital controller 918 as binary data. Time data may be received as binary data received over successive zero crossings. This time data is communicated to a display clock module 920 within the appliance components 902.

Figure 16A:
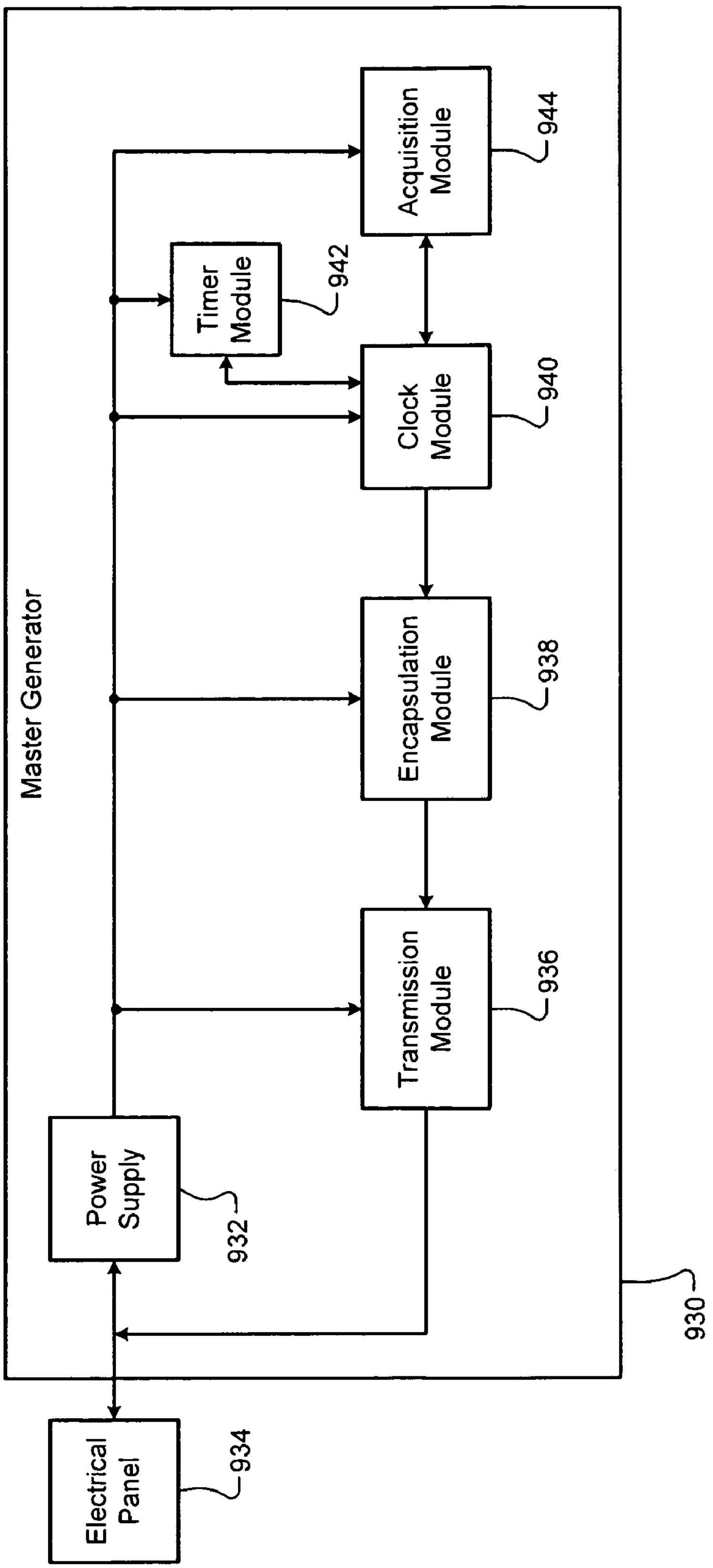
FIGS. 16A-16B are functional block diagrams of exemplary master generators according to the principles of the present disclosure.

Referring now to FIG. 16A, a functional block diagram of an exemplary master generator 930 according to the principles of the present disclosure is presented. The master generator 930 includes a power supply 932, which communicate via an electrical distribution line with an electrical panel 934. The power supply 932 provides power to a transmission module 936, an encoding module 938, a clock module 940, a timer module 942, and an time acquisition module 944.

The time acquisition module 944 may acquire time data in ways such as those discussed with respect to FIGS. 2-6. For example, the time acquisition module 944 may receive time data via an electrical distribution module line using a receiver such as the receiver 904 of FIG. 15B. The time acquisition module 944 may also acquire time data via radio frequency (RF) signals, or from a network interface.

The time acquisition module 944 communicates time data to the clock module 940. The time acquisition module 944 may passively receive time data, or may actively request time data. The clock module 940 may instruct the time acquisition module 944 to acquire time data. For example, as shown in FIG. 14, the clock module 940 may periodically request that time data be acquired, and also may be manually actuated by a user.

The clock module 940 communicates time data to the encoding module 938. The clock module 940 may communicate time data to the encoding module 938 for transmission to appliances at periodic intervals. The timer module 942 keeps track of these intervals. Additionally, the clock module 940 may transmit time data when received time data differs significantly from time data previously stored within the clock module 940, suggesting that the stored time data was inaccurate.

Additionally, the clock module 940 may transmit time data upon the occurrence of certain events. These events may include power from the electrical panel 934 being restored and a user manually requesting such transmission of the master generator 930. The encoding module 938 converts time data into messages for transmission on the electrical distribution line.

The encoding module 938 forms one or more messages containing the time data. These messages are communicated to the transmission module 936. The transmission module 936 serially transmits messages received from the encoding module 938. In various implementations, the transmission module 936 transmits more than one bit simultaneously, such as by transmitting varying voltages.

In various implementations, the transmission module 936 superimposes a high frequency signal upon a power signal present on the electrical distribution line. This superposition may be performed when the power signal has a voltage near zero volts. The transmission module 936 may transmit a signal at the zero crossing of the power signal, and/or before the zero crossing, and/or after the zero crossing.

Figure 16B:
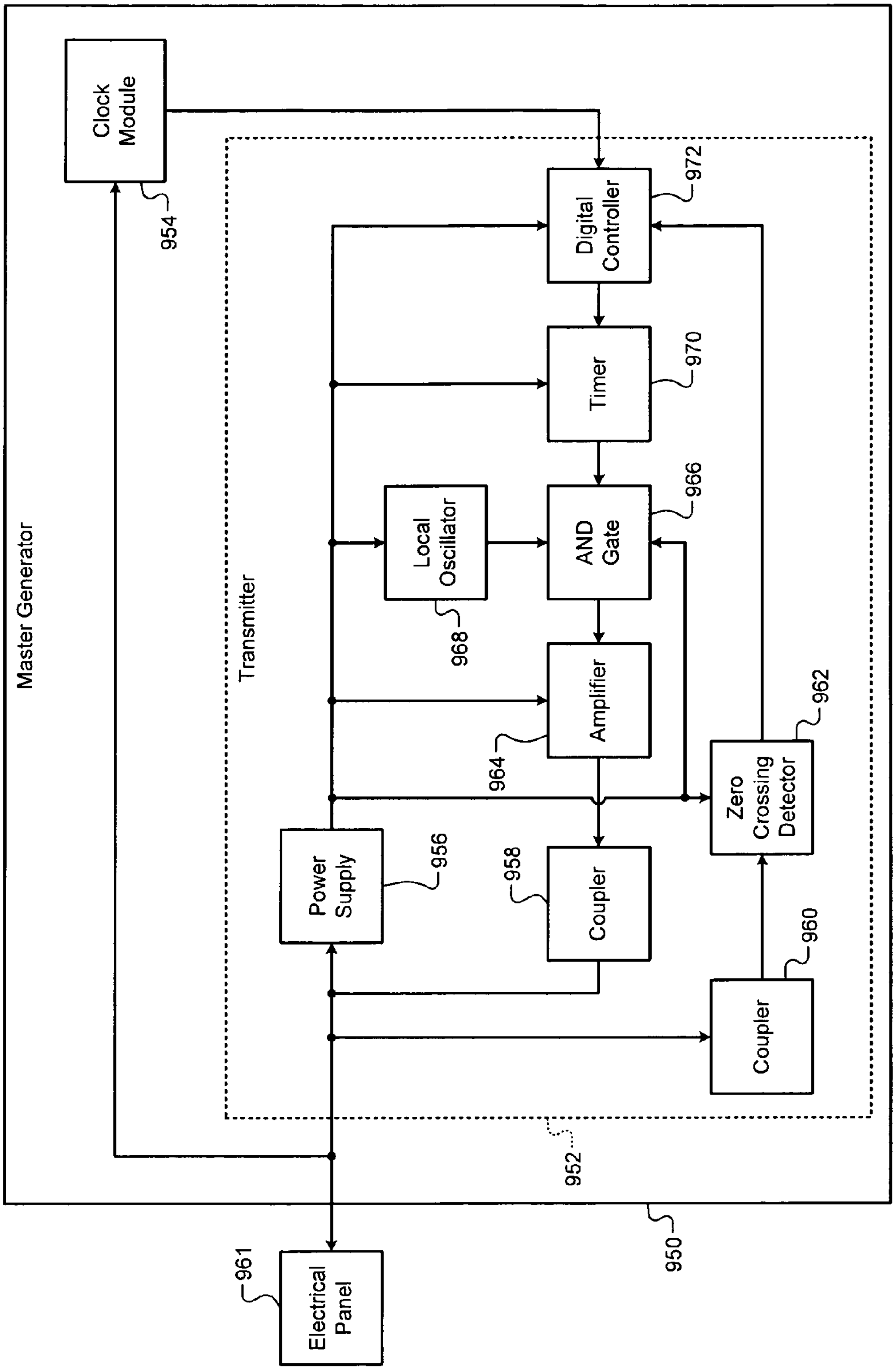

Referring now to FIG. 16B, a functional block diagram of an exemplary master generator 950 according to the principles of the present disclosure is presented. The master generator 950 includes a transmitter 952 and a clock module 954. The transmitter 952 includes a power supply 956, a first coupler 958, and a second coupler 960. The power supply 956 receives electrical power from an electrical panel 961, and provides stable power to components of the transmitter 952.

The transmitter 952 may include a zero crossing detector 962, an amplifier 964, an AND gate 966, a local oscillator 968, a timer 970, and a digital controller 972. The second coupler 960 receives electrical signals from the electrical panel 961 and provides them to the zero crossing detector 962. The second coupler 960 may reduce the voltage of incoming signals and/or electrically isolate the zero crossing detector 962.

The zero crossing detector 962 outputs a signal to the timer 970 and the digital controller 972 when a zero crossing event has occurred in the incoming power signal. The clock module 954 generates time data for transmission to the digital controller 972. The digital controller 972 then formats and/or processes the data, and prepares a binary output sequence for transmission onto the electrical distribution lines.

The digital controller 972 then serially transmits the binary output sequence. For each one bit, the digital controller 972 sends a signal to the timer 970 upon receiving a zero crossing signal from the zero crossing detector 962. The timer 970 asserts an output from the time it receives a signal from the digital controller 972 until a specified time afterward. The local oscillator 968 produces a periodic signal, such as a 120 kHz sign wave.

The AND gate 966 performs a logical AND operation on the periodic signal from the local oscillator 968 and the output of the timer 970. The output of the AND gate 966 is communicated to the amplifier 964, which amplifies the signal for placement on the electrical distribution line. The first coupler 958 superimposes the output of the amplifier 964 onto the electrical lines. For each zero bit, the digital controller 972 sends no signal to the timer 970, thereby placing no signal on the electrical distribution line. Alternately, the digital controller 972 may swap the operation for zero and one bits.

Figure 17:
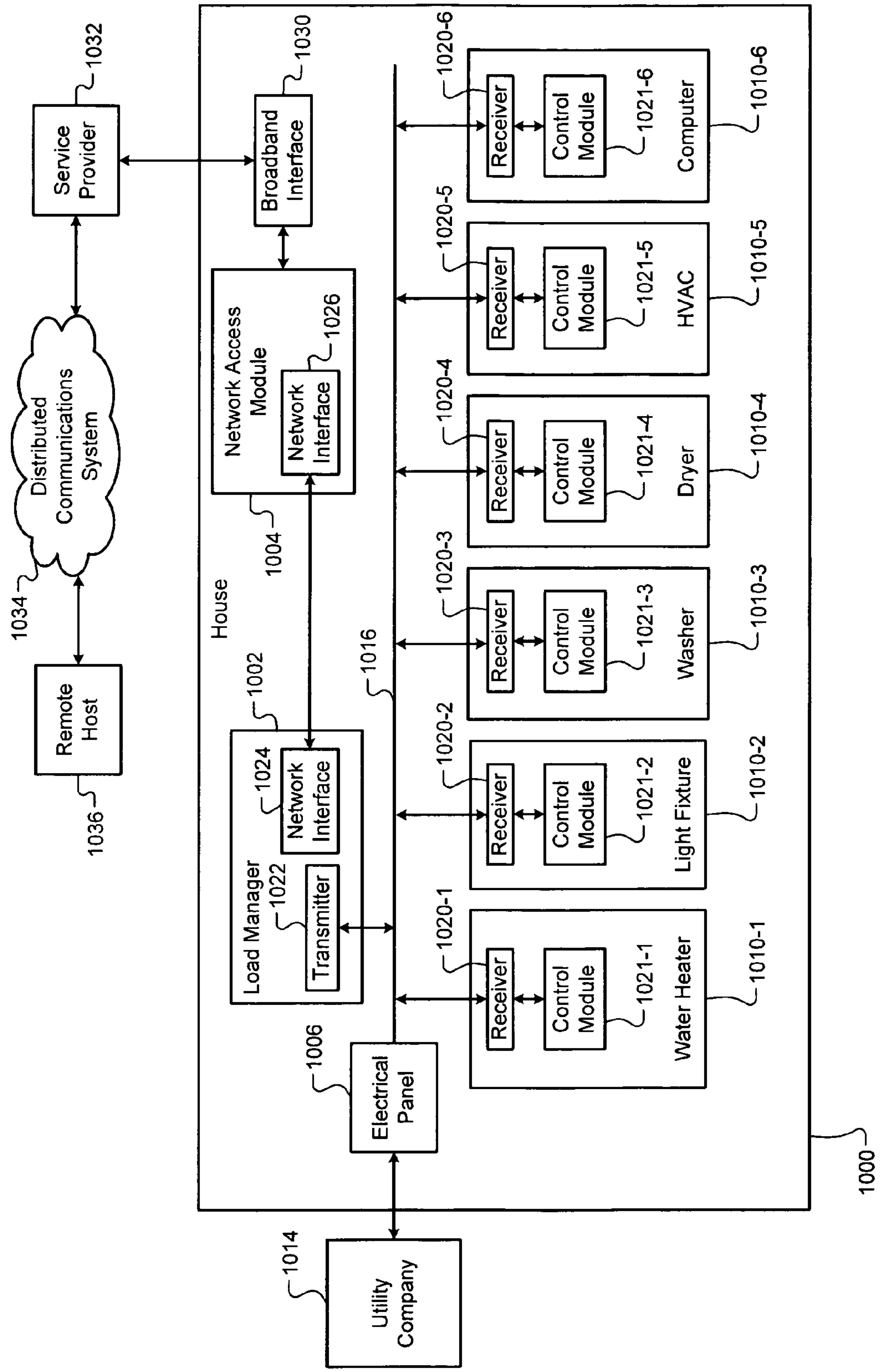
FIGS. 17-20 are functional block diagrams of exemplary load management systems according to the principles of the present disclosure.

Referring now to FIG. 17, a functional block diagram of an exemplary load management system according to the principles of the present disclosure is presented. A house 1000 includes a load manager module 1002 and an electrical panel 1006. The house 1000 may further include a water heater 1010-1, one or more light fixtures 1010-2, a clothes washer 1010-3, a clothes dryer 1010-4, a heating ventilation air conditioning (HVAC) system 1010-5, and a computer 1010-6, collectively appliances 1010.

The electrical panel 1006 receives power from a utility company 1014, and provides one or more phases of power on one or more electrical distribution lines 1016. The appliances 1010 include receivers 1020-1, 1020-2, 1020-3, 1020-4, 1020-5, and 1020-6, respectively, which communicate with control modules 1021-1, 1021-2, 1021-3, 1021-4, 1021-5, and 1021-6, respectively. The load manager module 1002 includes a transmitter 1022 and a network interface 1024.

The network interface 1024 communicates with a broadband interface 1030. The network interface 1024 may be wireline and/or wireless, such as IEEE 802.3 and/or IEEE 802.11, 802.11a, 802.11b, 802.11g, 802.11h, 802.11n, 802.16, 802.20, and Bluetooth. The network interface 1024 may also include a universal serial bus (USB) controller. The broadband interface 1030 may include, for example, a cable modem, a digital subscriber line (DSL) modem, a satellite receiver, and/or a router.

The broadband interface 1030 communicates with a service provider 1032. The service provider 1032 communicates through a distributed communications system 1034, such as the Internet, with a remote host 1036. In various implementations, the load manager 1002 and the broadband interface 1030 may be co-located within a single device 1038, and may be implemented as an integrated circuit.

The load manager module 1002 can receive load control signals from the remote host 1036 via the network interface 1024. The remote host 1036 may be controlled by a user or by the utility company 1014. Upon receiving load management signals, the load manager module 1002 can transmit control signals onto the electrical distribution line 1016 via the transmitter 1022. The load control signals are received by the receivers 1020, which actuate power saving modes within the respective appliances 1010.

The load manager module 1002 may transmit a global power reduction signal. The transmitter 1022 may know addresses of the receivers 1020 and transmit individual commands to the appliances 1010. The power reduction signal may instruct the appliances 1010 to reduce power as much as possible, or may instruct the appliances 1010 to reduce power consumption by a certain amount, either an absolute amount (such as a number of kilowatt-hours) or a percentage. The percentage may represent a percentage of the possible power reduction available to the appliance, or may represent a percentage of the total power consumption of the appliance.

For instance, the water heater 1010-1 may be instructed to reduce the temperature of the hot water. The light fixture 1010-2 may dim the lights. The washer 1010-3 may postpone a wash or spin cycle. The dryer 1010-4 may postpone drying or reduce drying temperature. The HVAC system 1010-5 may reduce fan speed and/or reduce the amount of heat or air conditioning produced. The computer 1010-6 may go into a power saving mode, such as standby or hibernation.

Figure 18:
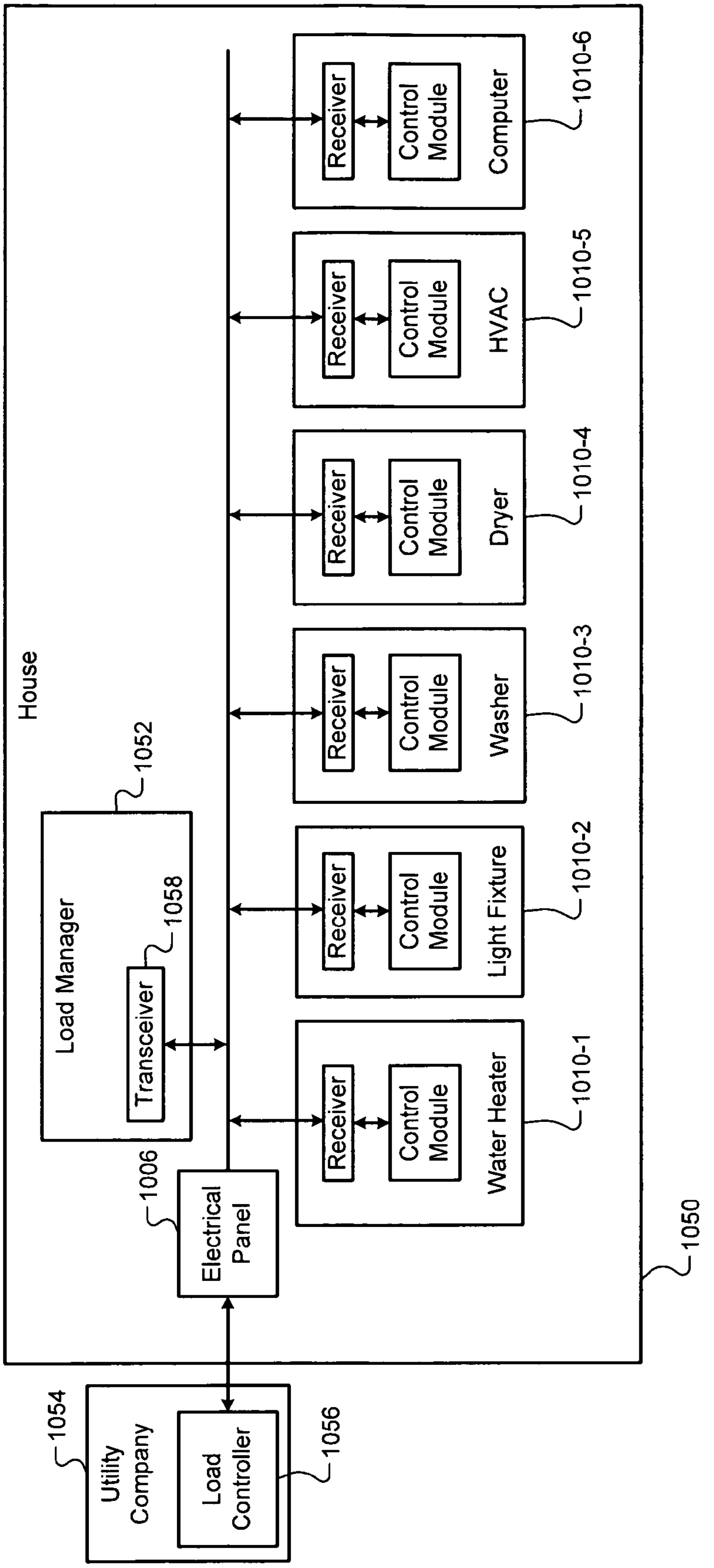

Referring now to FIG. 18, a functional block diagram of another exemplary load management system according to the principles of the present disclosure is presented. For purposes of clarity, reference numerals from FIG. 17 are used to indicate similar components. A house 1050 includes a load manager 1052 and the electrical panel 1006.

The electrical panel 1006 receives power from a utility company 1054 and receives load management instructions from a load controller 1056 of the utility company 1054. The load manager 1052 includes a transceiver 1058, which receives load reduction commands through the electrical panel 1006. The load manager 1052 then uses the transceiver 1058 to issue appropriate load reduction signals to the appliances 1010.

Figure 19:
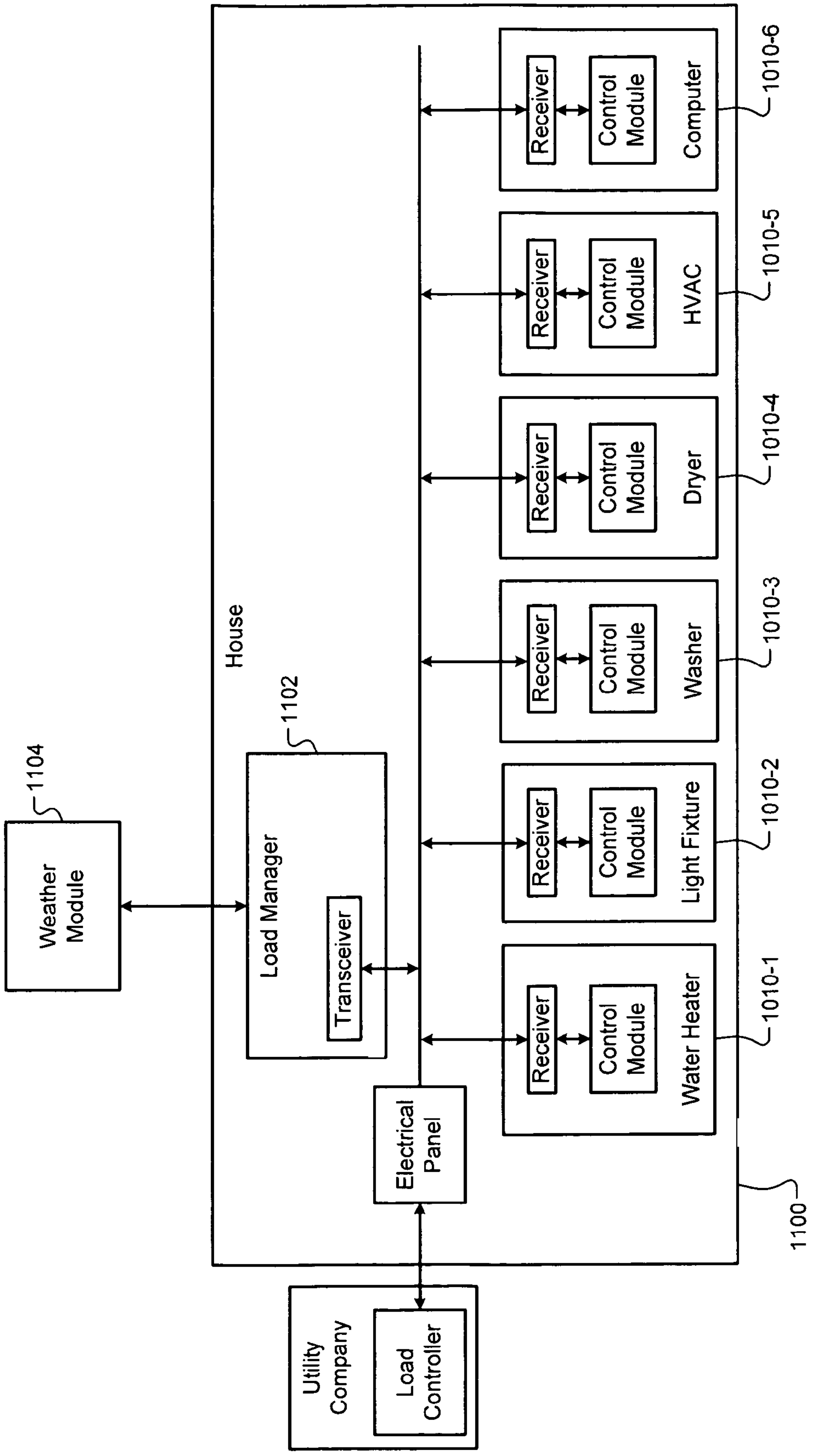

Referring now to FIG. 19, a functional block diagram of another exemplary load management system according to the principles of the present disclosure is presented. For purposes of clarity, reference numerals from FIG. 18 are used to identify similar components. A house 1100 includes a load manager 1102. The load manager 1102 communicates with a weather module 1104. The weather module 1104 provides data on temperature, humidity, barometric pressure, etc., to the load manager 1102, so that the load manager 1102 can determine how best to save power in the appliances 1010.

For instance, the dryer 1010-4 may be less efficient in humid conditions. The load manager 1102 may therefore instruct the dryer 1010-4 to delay drying until the load manager 1102 determines that the humidity has fallen to an acceptable level. The light fixture 1010-2 may be dimmed more significantly when the load manager 1102 determines that the outside sky is bright, as determined by a photoelectric sensor or the like in the weather module 1104.

The load manager 1102 may instruct the HVAC system 1010-5 to reduce the amount of heat being generated if measurements by the weather module 1104 indicate that the outside temperature will soon rise. Likewise, if the outside temperature is falling, the load manager 1102 may instruct the HVAC system 1010-5 to decrease air conditioning output.

Figure 20:
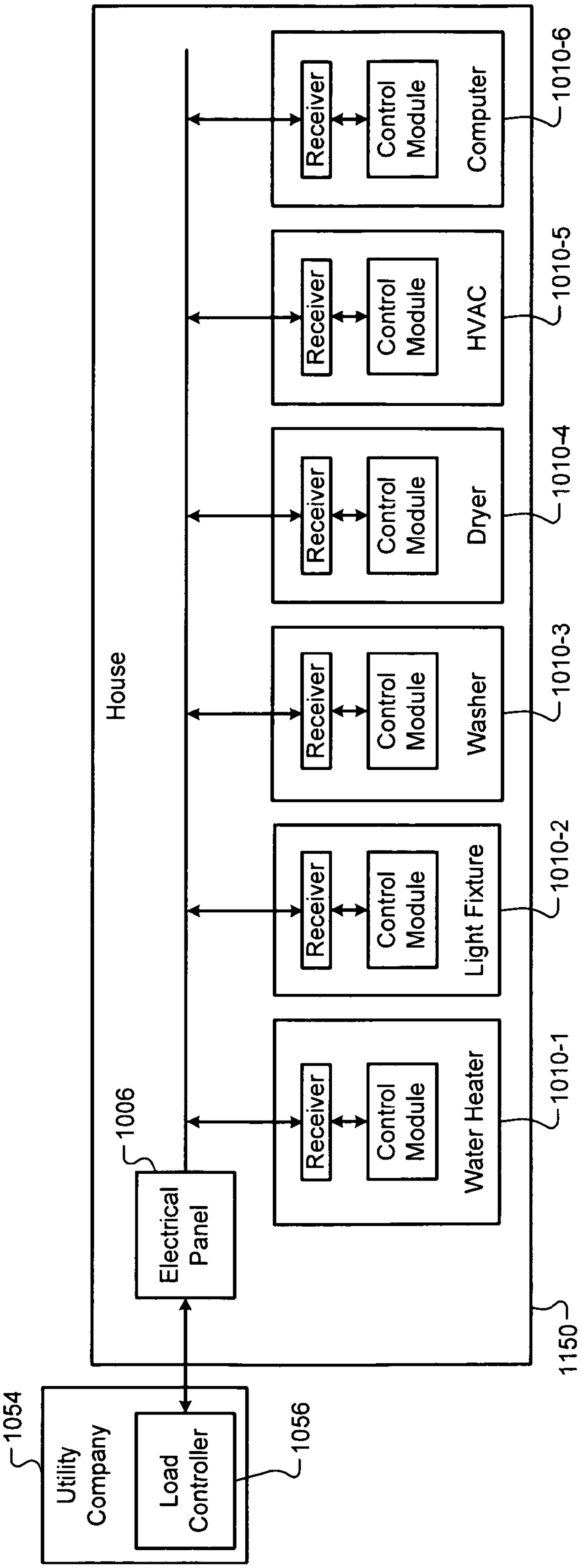

Referring now to FIG. 20, a functional block diagram of another exemplary load management system according to the principles of the present disclosure is presented. For purposes of clarity, reference numerals from FIG. 18 are used to identify similar components. A house 1150 includes the appliances 1010. The utility company 1054 includes the load controller 1056 that generates load reduction and resume commands.

These commands are communicated to the appliances 1010 through the electrical panel 1006 of the house 1150. The appliances 1010 receive the load reduction commands and take appropriate load reduction steps. When the appliances 1010 receive a load resume command from the load controller 1056, the appliances 1010 resume their previous power state.

Figure 21:
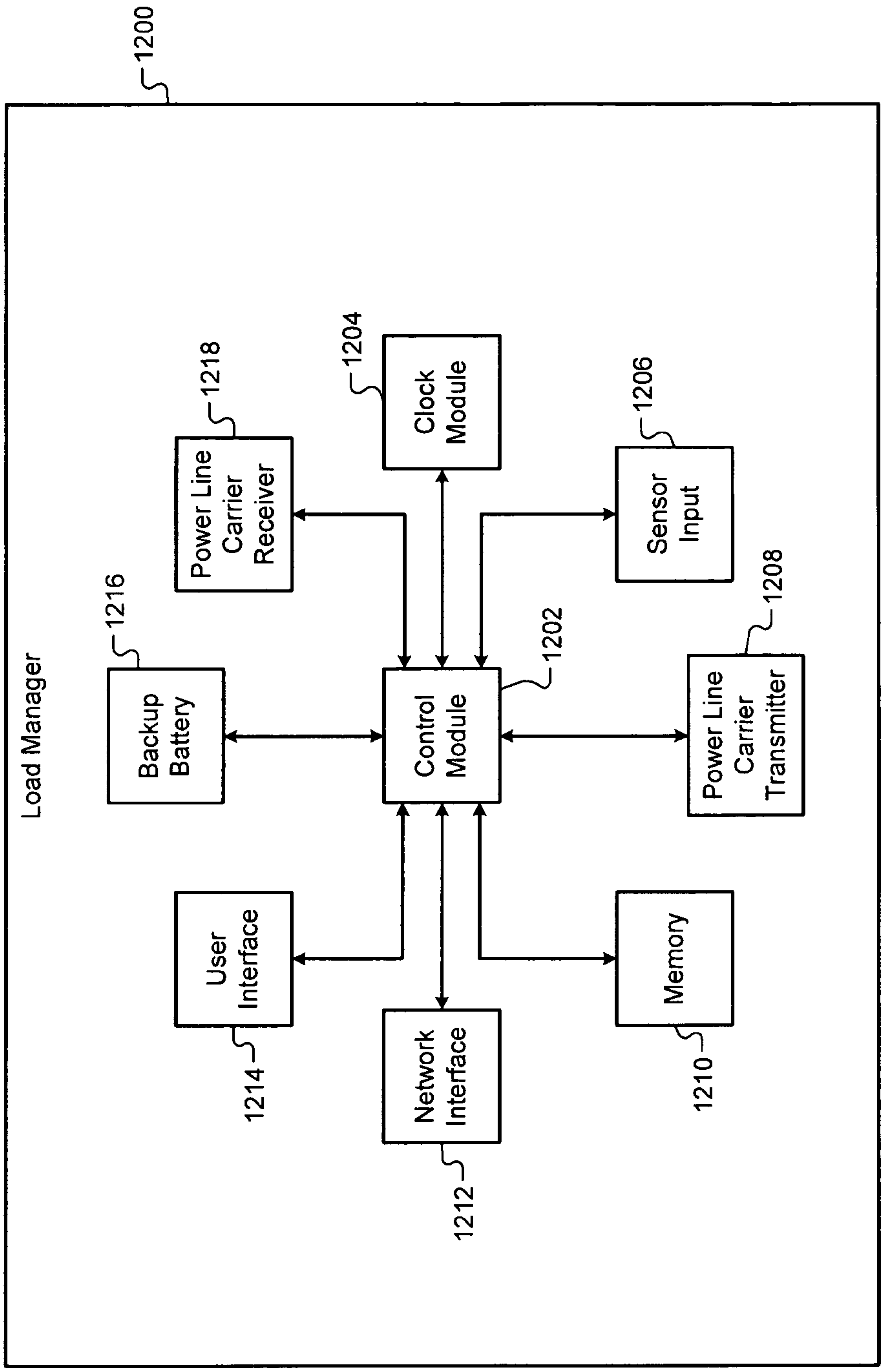
FIG. 21 is a functional block diagram of an exemplary load manager according to the principles of the present disclosure.

Referring now to FIG. 21, a functional block diagram of a load manager 1200, such as the load manager module 1002 of FIG. 17, is presented. The load manager 1200 includes a control module 1202, a clock module 1204, a sensor input module 1206, a power line carrier transmitter 1208, memory 1210, a network interface 1212, a user interface 1214, a backup battery 1216, and a power line carrier receiver 1218. The clock module 1204 stores time data. This time data may be transmitted to appliances (not shown) by the power line carrier transmitter 1208.

The date and time may also be used by the control module 1202 to determine the current rate at which electricity is being charged by the utility company. For instance, the utility company may have higher rates during peak hours, such as from 9:00 am until 7:00 pm. During these times, the control module 1202 may generate load reduction signals, or may instruct higher levels of reduction in the load reduction signals.

The sensor input module 1206 receives input from such sensors as indoor and outdoor temperature sensors, light sensors, water sensors, etc. Memory 1210 may include parameters such as utility rates and times, appliance characteristics and load reduction parameters, and software code for the control module 1202. Memory 1210 may include a table that stores characteristics and load reduction parameters for each appliance. Memory 1210 may include volatile and/or non-volatile storage. The network interface 1212 allows the control module 1202 to interface with a computer (not shown) for easier control by a user, or to receive commands over a distributed communications system such as the Internet.

The control module 1202 may receive time data, weather data, and utility load reduction commands via a distributed communications system such as the Internet. The user interface 1214 allows the user to directly interact with the load manager 1200, such as by programming load reduction parameters, time data, and/or appliance characteristics. The backup battery 1216 allows the control module 1202 to retain state data, such as time data. The control module 1202 may receive time data and/or other control signals via the power line carrier receiver 1218.

Figure 22:
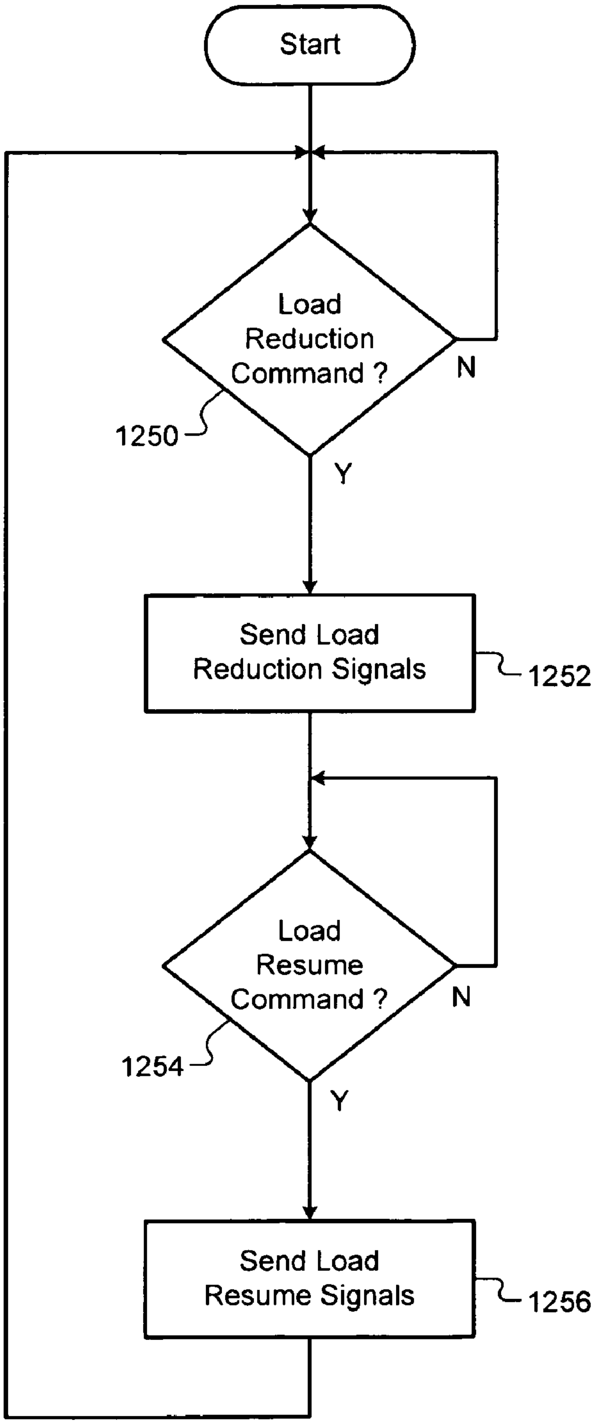
FIG. 22 is a flow chart depicting exemplary operation of a load manager according to the principles of the present disclosure.

Referring now to FIG. 22, a flow chart depicting exemplary operation of a load manager according to the principles of the present disclosure is presented. Control begins in step 1250. If a load reduction command is received, command transfers to step 1252; otherwise, control remains in step 1250. In step 1252, control sends appropriate load reduction signals to appliances. Control continues in step 1254. If a load resume command is received, control transfers to step 1256; otherwise, control remains in step 1254. In step 1256, control sends appropriate load resume signals to appliances and control returns to step 1250.

Figure 23A:
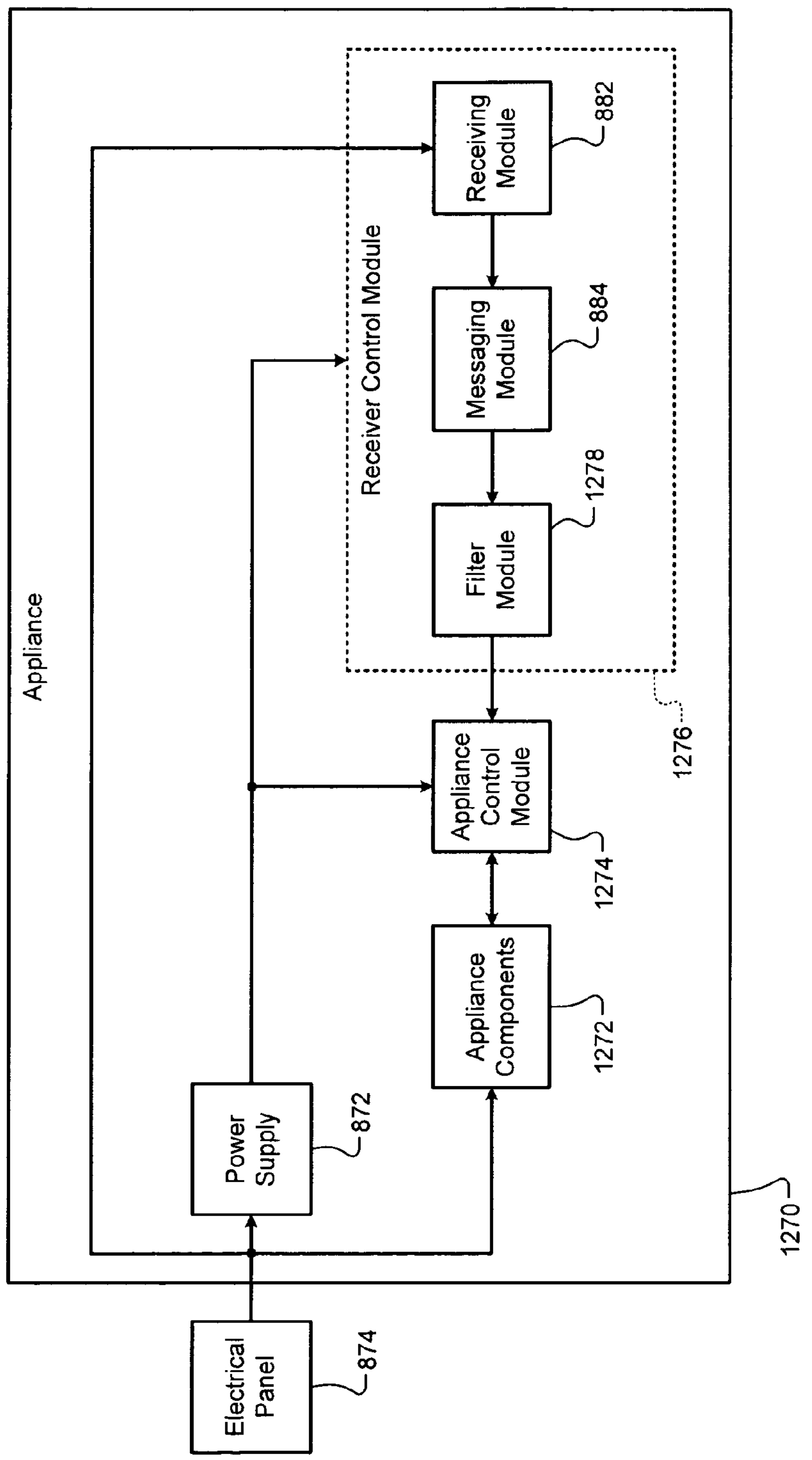
FIGS. 23A-23B are functional block diagrams of exemplary appliances according to the principles of the present disclosure.

Referring now to FIG. 23A, a functional block diagram of an exemplary appliance 1270 according to the principles of the present disclosure is presented. For purposes of clarity, reference numerals from FIG. 15A are used to identify similar components. The appliance 1270 includes appliance components 1272, an appliance control module 1274, a receiver control module 1276, and the power supply 872. The power supply 872 receives power from the electrical panel 874 via an electrical distribution line. The appliance components 1272 may receive a power signal from the electrical panel 872 as shown in FIG. 23A, or may be powered by the power supply 872.

The receiver control module 1276 includes the receiving module 882, the messaging module 884, and a filter module 1278. The receiving module 882 receives control and/or data signals from the electrical distribution line, as discussed in more detail with respect to FIG. 15A. The messaging module 884 converts signals from the receiving module 882 into messages, which are communicated to the filter module 1278.

The filter module 1278 determines whether messages are addressed to the appliance 1270 and whether the messages contain load commands. The filter module 1278 may discard messages that are not addressed to the appliance 1270 or do not contain load reduction and/or resume commands. The filter module 1278 communicates load commands to the appliance control module 1274. The appliance control module 1274 directs the appliance components 1272 to assume a state that draws less power.

Figure 23B:
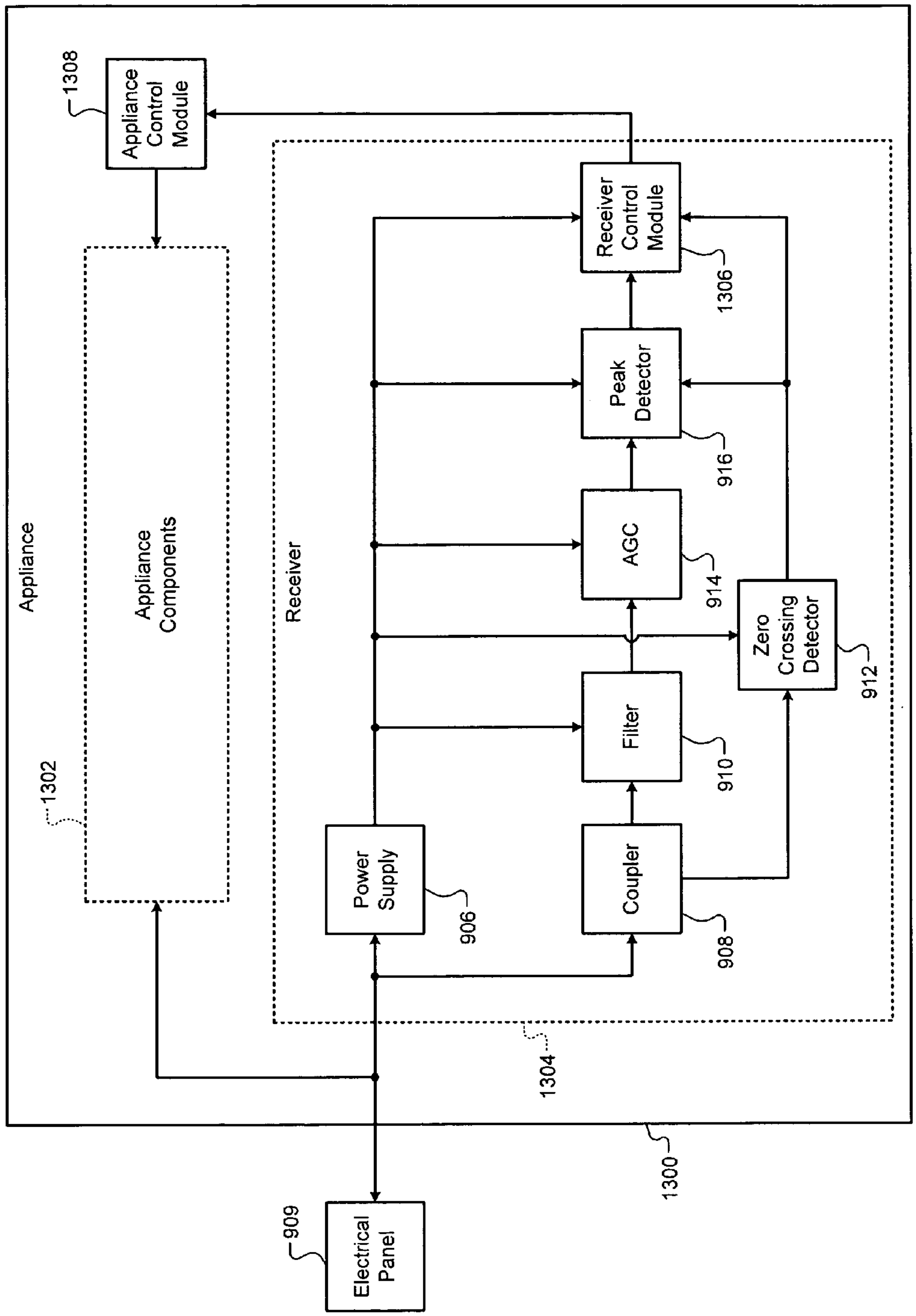

Referring now to FIG. 23B, a functional block diagram of an exemplary appliance 1300 according to the principles of the present disclosure, such as one of the appliances 1010 of FIG. 17, is presented. For purposes of clarity, reference numerals from FIG. 15B are used to identify similar components.

The appliance 1300 includes appliance components 1302 and a receiver 1304 including a receiver control module 1306. The appliance components 1302 communicate with an appliance control module 1308, which receives load reduction and resume signals from the receiver control module 1306. The appliance control module 1308 takes appropriate action to minimize power consumed by the appliance components 1302.

Figure 24A:
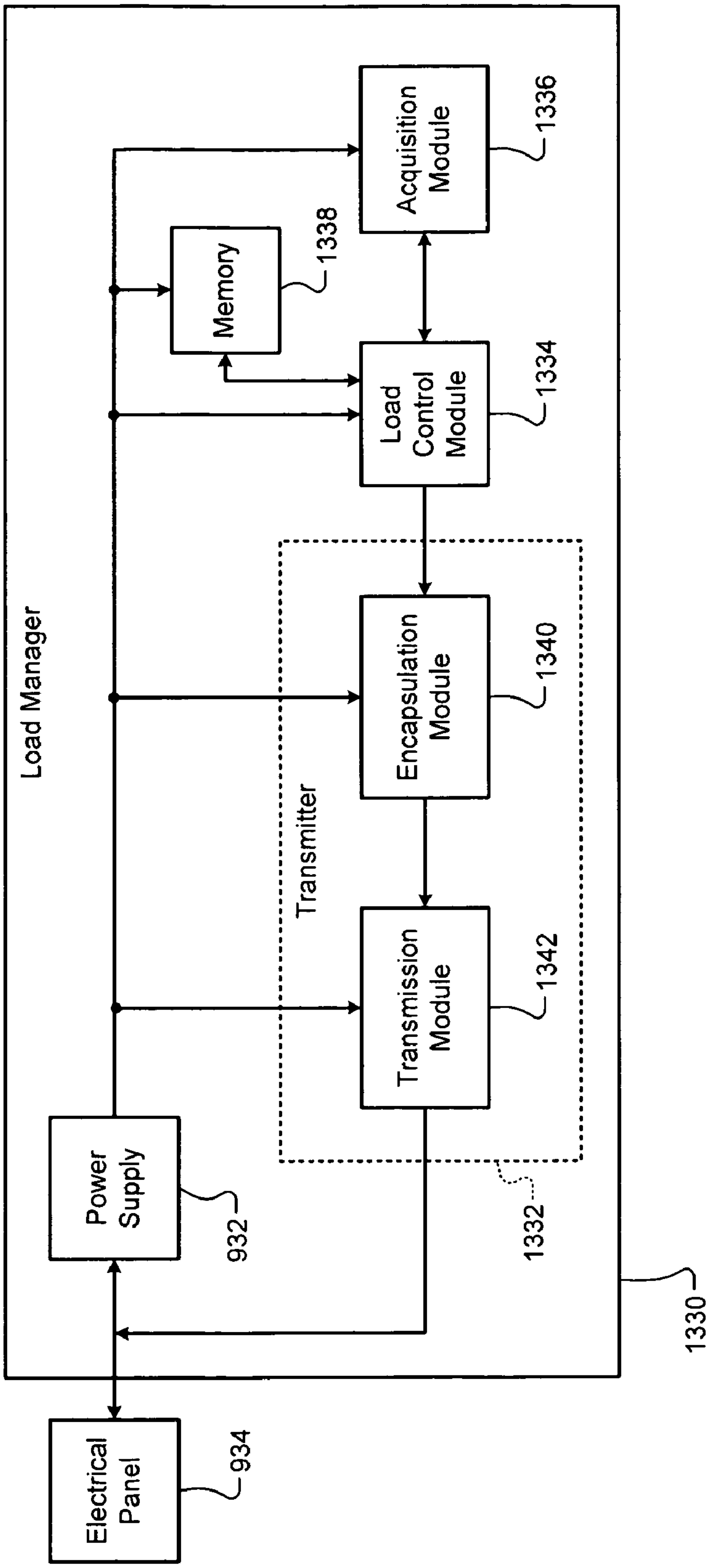
FIGS. 24A-24B are functional block diagrams of exemplary load managers according to the principles of the present disclosure.

Referring now to FIG. 24A, a functional block diagram of an exemplary load manager 1330 according to the principles of the present disclosure is presented. For purposes of clarity, reference numerals from FIG. 16A are used to identify similar components. The load manager 1330 includes the power supply 932, a transmitter 1332, a load control module 1334, an time acquisition module 1336, and memory 1338. The power supply 932 receives power from the electrical panel 934 over an electrical distribution line.

The time acquisition module 1336 receives power control signals, such as power reduction signals and power resume signals. The time acquisition module 1336 may receive these signals via a network interface or an electrical distribution line, as described in more detail with respect to FIG. 21. The time acquisition module 1336 communicates power commands to the load control module 1334.

The load control module 1334 communicates with memory 1338 to retrieve load information about appliances in communication with the electrical panel 934. The transmitter 1332 includes an encoding module 1340 and a transmission module 1342. The load control module 1334 communicates load reduction commands to the encoding module 1340.

The load control module 1334 may send a single global load reduction command or may tailor load commands to individual appliances based on data from memory 1338. The load control module 1334 may send a global load reduction command to all appliances as a multicast, or send the global reduction command to each individual appliance as a unicast. The encoding module 1340 places commands from the load control module 1334 into messages, which are communicated to the transmission module 1342. The transmission module 1342 communicates the messages serially to appliances via the electrical distribution line.

Figure 24B:
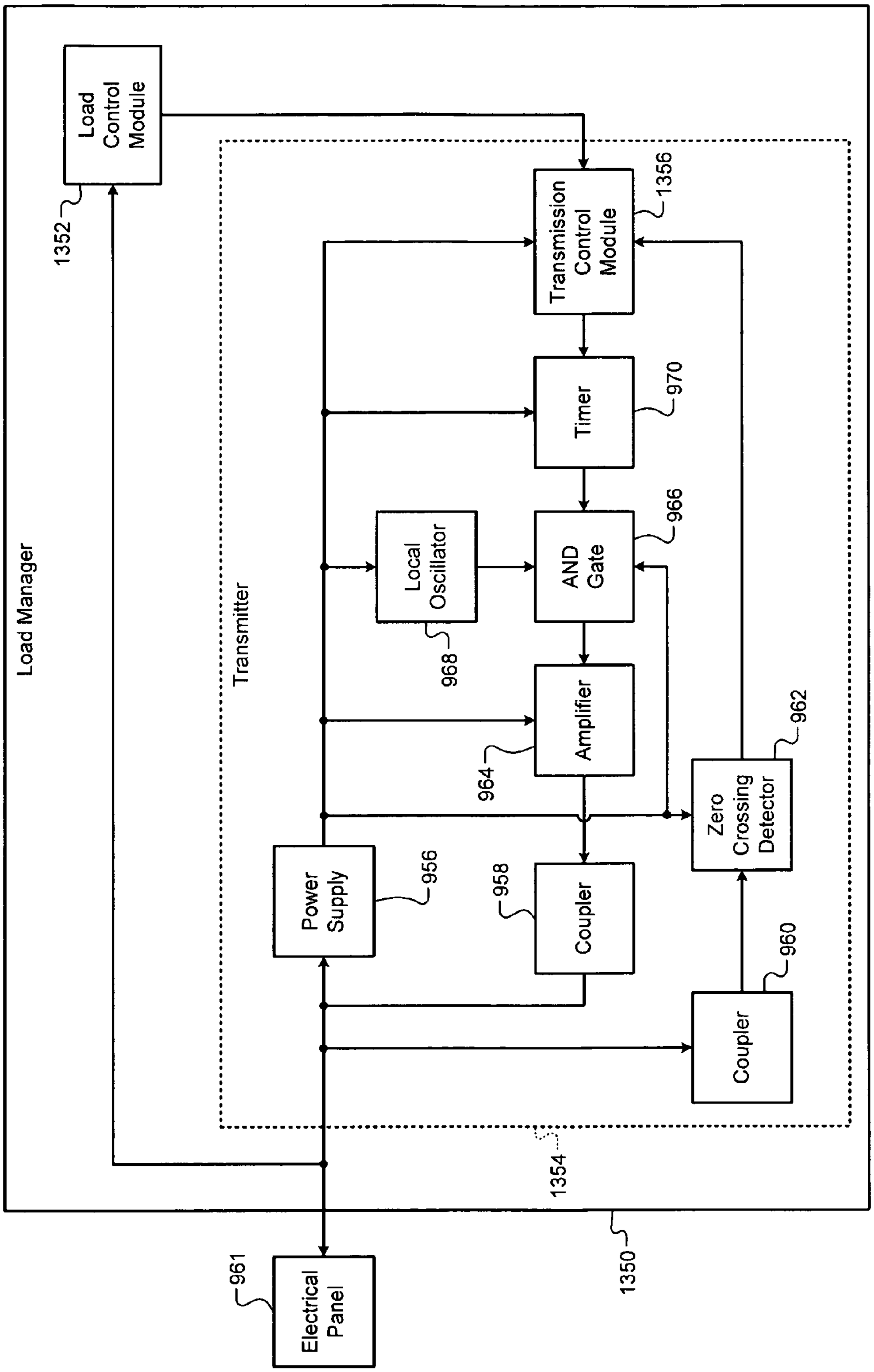

Referring now to FIG. 24B, a functional block diagram of an exemplary load manager 1350 according to the principles of the present disclosure, such as the load manager module 1002 of FIG. 17, is presented. For purposes of clarity, reference numerals from FIG. 16B are used to identify similar components.

The load manager 1350 includes a load control module 1352 and a transmitter 1354 including a transmission control module 1356. The load control module 1352 interprets load reduction commands and sends appropriate load reduction signals, as described in greater detail with respect to FIG. 21, to the transmission control module 1356 for communication over an electrical distribution line.

Figure 25B:
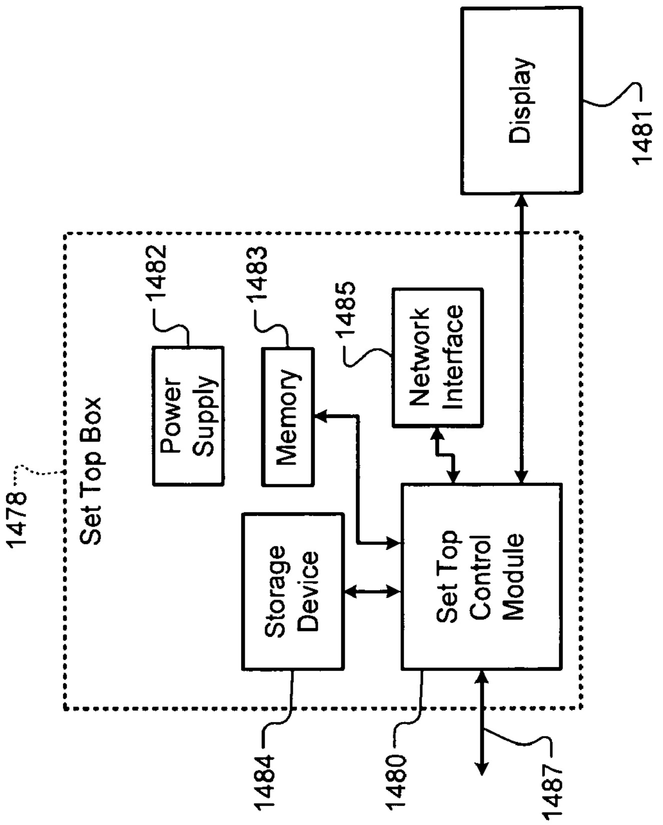
FIG. 25B is a functional block diagram of a DVD drive.
Figure 25A:
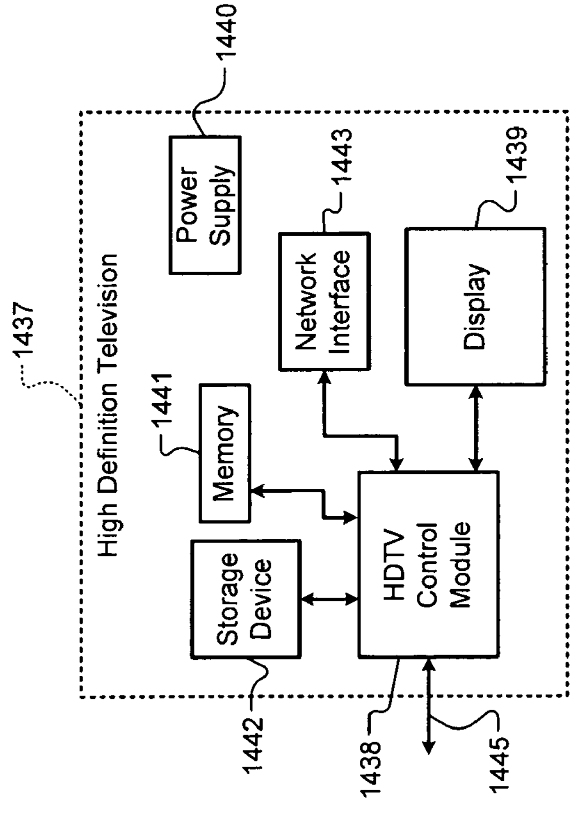
FIG. 25A is a functional block diagram of a hard disk drive.

Referring now to FIGS. 25A-25B, various exemplary implementations incorporating the teachings of the present disclosure are shown. Referring now to FIG. 25A, the teachings of the disclosure can be implemented in a power supply 1440 of a high definition television (HDTV) 1437. The HDTV 1437 includes a HDTV control module 1438, a display 1439, the power supply 1440, memory 1441, a storage device 1442, a network interface 1443, and an external interface 1445. If the network interface 1443 includes a wireless local area network interface, an antenna (not shown) may be included.

The HDTV 1437 can receive input signals from the network interface 1443 and/or the external interface 1445, which can send and receive data via cable, broadband Internet, and/or satellite. The HDTV control module 1438 may process the input signals, including encoding, decoding, filtering, and/or formatting, and generate output signals. The output signals may be communicated to one or more of the display 1439, memory 1441, the storage device 1442, the network interface 1443, and the external interface 1445.

Memory 1441 may include random access memory (RAM) and/or nonvolatile memory such as flash memory, phase change memory, or multi-state memory, in which each memory cell has more than two states. The storage device 1442 may include an optical storage drive, such as a DVD drive, and/or a hard disk drive (HDD). The HDTV control module 1438 communicates externally via the network interface 1443 and/or the external interface 1445. The power supply 1440 provides power to the components of the HDTV 1437.

Referring now to FIG. 25B, the teachings of the disclosure can be implemented in a power supply 1482 of a set top box

1478. The set top box 1478 includes a set top control module 1480, a display 1481, the power supply 1482, memory 1483, a storage device 1484, and a network interface 1485. If the network interface 1485 includes a wireless local area network interface, an antenna (not shown) may be included.

The set top control module 1480 may receive input signals from the network interface 1485 and an external interface 1487, which can send and receive data via cable, broadband Internet, and/or satellite. The set top control module 1480 may process signals, including encoding, decoding, filtering, and/or formatting, and generate output signals. The output signals may include audio and/or video signals in standard and/or high definition formats. The output signals may be communicated to the network interface 1485 and/or to the display 1481. The display 1481 may include a television, a projector, and/or a monitor.

The power supply 1482 provides power to the components of the set top box 1478. Memory 1483 may include random access memory (RAM) and/or nonvolatile memory such as flash memory, phase change memory, or multi-state memory, in which each memory cell has more than two states. The storage device 1484 may include an optical storage drive, such as a DVD drive, and/or a hard disk drive (HDD).

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A master generator located in a building to update time data of devices in the building, the master generator comprising:

an acquisition module configured to acquire time data representing current time of day;

a clock module configured to (i) receive the time data from the acquisition module, (ii) store the time data, and (iii) periodically update the time data;

an encoding module configured to encode the time data from the clock module into time messages;

a transmission module configured to selectively superimpose the time messages onto a power signal of the building for transmission to the devices; and a load control module configured to generate load control commands based on load control instructions, wherein the acquisition module receives the load control instructions, wherein the encoding module encodes the load control commands into load control messages, wherein the transmission module superimposes the load control messages onto the power signal for transmission to the devices, and wherein the load control module is configured to (i) control a dryer using the load control commands, (ii) receive a humidity signal indicating a humidity level, and (iii) in response to the humidity level being above a predetermined threshold, use the load commands to selectively disable the dryer until the humidity level is below the predetermined threshold.

2. The master generator of claim 1, further comprising a backup power source configured to power the clock module when power is interrupted to the master generator.

3. The master generator of claim 1, wherein:

the clock module is configured to store and periodically update date data, the encoding module is configured to encode the date data into date messages, and the transmission module is configured to superimpose the date messages onto the power signal.

4. The master generator of claim 1, wherein the acquisition module includes a radio frequency (RF) receiver.

5. The master generator of claim 1, wherein the acquisition module includes a network interface configured to receive the load control instructions from a computer network.

6. An integrated circuit, comprising:

the master generator of claim 1; and a network interface in communication with a computer network.

7. The master generator of claim 1, wherein the acquisition module includes a user interface configured to receive the load control instructions from a user.

8. The master generator of claim 1, wherein the acquisition module includes a power line carrier receiver configured to receive the load control instructions.

9. The master generator of claim 1, wherein the load control module is configured to commonly control the devices using a single load control command.

10. The master generator of claim 1, wherein the acquisition module includes a power line carrier receiver configured to receive the load control instructions from a utility company.

11. The master generator of claim 1, further comprising a sensor input module configured to receive environment signals.

12. The master generator of claim 11, wherein the sensor input module is configured to receive signals from at least one of a temperature sensor, a light sensor, a water sensor, a barometer, a hygrometer, and an anemometer.

13. A system comprising:

the master generator of claim 1; and one of the devices, the one of the devices comprising:

a clock module configured to store first time data representing time of day;

a display module configured to visually display the first time data;

a receiving module configured to receive the time messages via the power signal; and an updating module configured to selectively replace the first time data based on the time messages.

14. The system of claim 13, wherein the one of the devices further comprises:

a device control module configured to generate a control signal based on load control messages in the power signal; and at least one power-consuming component configured to reduce power consumption based on the control signal.

15. The system of claim 14, wherein the one of the devices comprises at least one of a water heater, a light fixture, a clothes washer, the dryer, a heating ventilation air conditioning system, and a computer.

16. The system of claim 14, wherein the power-consuming component is configured to selectively reduce light output based on the control signal.

17. The system of claim 14, wherein the power-consuming component is configured to selectively enter one of a standby state and a hibernation state based on the control signal.

18. The system of claim 14, wherein the power-consuming component is configured to selectively decrease one of heat output, operating voltage, and operating current based on the control signal.

19. A method for operating a controller in a building, the method comprising:

acquiring time data representing current time of day;

storing and periodically updating the time data;

encoding the time data into time messages;

selectively superimposing the time messages onto a power signal of the building for transmission to devices of the building;

receiving load control instructions at the controller in the building;

generating load control commands based on the load control instructions;

encoding the load control commands into load control messages;

selectively superimposing the load control messages onto the power signal for transmission from the controller to the devices;

controlling a dryer in the building;

receiving a humidity signal indicating a humidity level; and in response to the humidity level being above a predetermined threshold, using the load control commands to selectively disable the dryer until the humidity level is below the predetermined threshold.

20. The method of claim 19, further comprising providing a backup power source configured to maintain the time data when power to the controller is interrupted.

21. The method of claim 19, further comprising:

storing and periodically updating date data;

encoding the date data into date messages; and selectively superimposing the date messages onto the power signal.

22. The method of claim 19, wherein the acquiring includes using a radio frequency (RF) receiver.

23. The method of claim 19, wherein the receiving includes using a network interface in communication with a computer network.

24. The method of claim 19, further comprising receiving the load control instructions from a user via a user interface.

25. The method of claim 19, further comprising receiving the load control instructions via a power line carrier receiver.

26. The method of claim 19, further comprising generating a single load control command to commonly control the devices.

27. The method of claim 19, further comprising receiving the load control instructions from a utility company via a power line carrier receiver.

28. The method of claim 19, further comprising sensing environmental signals.

29. The method of claim 28, further comprising receiving the environmental signals from at least one of a temperature sensor, a light sensor, a water sensor, a barometer, a hygrometer, and an anemometer.

30. The method of claim 19, further comprising:

providing one of the devices;

storing, using the one of the devices, first time data representing time of day;

visually displaying, using the one of the devices, the first time data;

receiving, using the one of the devices, the time messages via the power signal; and selectively replacing, using the one of the devices, the first time data based on the time messages.

31. The method of claim 30, further comprising:

generating, using the one of the devices, a control signal based on at least one of the load control messages in the power signal; and reducing power to at least one power-consuming component of the one of the devices based on the control signal.

32. The method of claim 31, further comprising reducing light output of the one of the devices based on the control signal.

33. The method of claim 31, further comprising controlling the one of the devices to enter one of a standby state and a hibernation state based on the control signal.

34. The method of claim 31, further comprising decreasing, using the one of the devices, at least one of heat output, operating voltage, and operating current based on the control signal.

35. The master generator of claim 5, wherein the computer network is a distributed communications system, and wherein the network interface is in communication with the distributed communications system via a broadband interface.

36. The master generator of claim 35, further comprising an integrated circuit implementing the network interface and the broadband interface.

37. The master generator of claim 9, wherein the single load control command instructs each of the devices to reduce power consumption by an absolute amount.

38. The master generator of claim 9, wherein the single load control command instructs each of the devices to reduce power consumption by a percentage.

39. The master generator of claim 38, wherein the percentage represents a percentage of possible power reduction available to each of the devices.

40. The master generator of claim 38, wherein the percentage represents a percentage of total power consumption of each of the devices.

41. The master generator of claim 1, wherein the load control module is configured to generate one of the load control commands for each of the devices.

42. The master generator of claim 1, wherein the load control module is configured to (i) control a light fixture inside the building using the load control commands, (ii) receive an outdoor light signal indicating an outdoor ambient light level, and (iii) selectively instruct the light fixture to output a decreased brightness using the load control commands until the outdoor ambient light level is below a predetermined light threshold.

43. The master generator of claim 1, wherein the load control module adjusts the load control commands based on the time data.

44. The master generator of claim 43, wherein the load control module adjusts the load control commands based on a comparison of (i) peak usage times from a utility company and (ii) the time data.

45. The method of claim 23, wherein the computer network is a distributed communications system, and wherein the network interface is in communication with the distributed communications system via a broadband interface.

46. The method of claim 26, wherein the single load control command instructs each of the devices to reduce power consumption by an absolute amount.

47. The method of claim 26, wherein the single load control command instructs each of the devices to reduce power consumption by a percentage.

48. The method of claim 47, wherein the percentage represents a percentage of possible power reduction available to each of the devices.

49. The method of claim 47, wherein the percentage represents a percentage of total power consumption of each of the devices.

50. The method of claim 19, further comprising generating one of the load control commands for each of the devices.

51. The method of claim 19, further comprising:

controlling a light fixture in the building;

receiving an outdoor ambient light signal indicating an outdoor light level; and selectively instructing a decreased brightness from the light fixture using the load control commands until the outdoor light level is below a predetermined light threshold.

52. The method of claim 19, further comprising adjusting the load control commands based on the time data.

53. The method of claim 52, further comprising adjusting the load control commands based on a comparison of (i) peak usage times from a utility company and (ii) the time data.

* * * * *